US012578850B2

(12) United States Patent (10) Patent No.: US 12,578,850 B2
Kishore et al. (45) Date of Patent: Mar. 17, 2026

(54) CONFIGURABLE VIRTUAL WHITEBOARD GRAPHICAL USER INTERFACE WITH AUTOMATION REGIONS

(71) Applicants:Atlassian Pty Ltd., Sydney (AU); Atlassian US, Inc., San Francisco, CA (US)

(72) Inventors: Abhinav Kishore, Sydney (AU); Jonathan George Katahanas, Sydney (AU); Matej Konecny, Utrecht (NL); Natalie Kate Johnson, Sydney (AU); Michael Oates, Sydney (AU); Cornelis Jacobus Alant, Sydney (AU); Christina Ristevski, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 75 days.

(21) Appl. No.: 18/128,320

(22) Filed: Mar. 30, 2023

(65) Prior Publication Data

US 2024/0329821 A1 Oct. 3, 2024

Related U.S. Application Data

(60) Provisional application No. 63/435,972, filed on Dec. 29, 2022.

(51) Int. Cl.
*G06F 3/048* (2013.01)
*G06F 3/0481* (2022.01)
*G06F 3/0486* (2013.01)
*G06F 9/54* (2006.01)
*G06F 16/242* (2019.01)
*G06F 40/174* (2020.01)

(52) U.S. Cl.
CPC .......... *G06F 3/0486* (2013.01); *G06F 3/0481* (2013.01); *G06F 9/543* (2013.01); *G06F 16/242* (2019.01); *G06F 40/174* (2020.01)

(58) Field of Classification Search
CPC ...... G06F 3/0486; G06F 3/0481; G06F 9/543; G06F 16/242; G06F 40/174
See application file for complete search history.

(56) References Cited

U.S. PATENT DOCUMENTS

2022/0342534 A1* 10/2022 Chen ..................... G06F 40/177
* cited by examiner

*Primary Examiner* — Aleksey Olshannikov
(74) *Attorney, Agent, or Firm* — Brownstein Hyatt Farber Schreck, LLP

(57) ABSTRACT

A computer-implemented method is disclosed. The method includes designating an area in a virtual whiteboard graphical user interface configured to receive a graphical object of a plurality graphical objects by dragging the graphical object to the designated area from other areas of a virtual whiteboard graphical user interface. The method includes extracting content of the graphical object dragged into the designated area, and identifying an action to be performed on the issue tracking platform. The method includes displaying an interface window including a preview of the action to be performed, and in response to receiving a confirmation input, generating an application programming interface (API) command including at least a portion of the extracted content and an API action to be performed.

21 Claims, 23 Drawing Sheets

500

| CAUSE DISPLAY OF A VIRTUAL WHITEBOARD GRAPHICAL USER INTERFACE ON A DISPLAY OF A CLIENT DEVICE | ~502 |

| RECEIVE A FIRST USER INPUT DESIGNATING AN ACTION REGION | ~504 |

| RECEIVE A SECOND USER INPUT ASSIGNING AN ACTION TO THE ACTION REGION | ~506 |

| RECEIVE A THIRD USER INPUT TO MOVE A GRAPHICAL OBJECT INTO THE ACTION REGION | ~508 |

| EXTRACT CONTENT FROM THE GRAPHICAL OBJECT MOVED INTO THE ACTION REGION | ~510 |

| CAUSE DISPLAY OF AN INTERFACE WINDOW TO DISPLAY A PROPOSED ACTION OR THE EXTRACTED CONTENT | ~512 |

| GENERATE AN APPLICATION PROGRAMMING INTERFACE (API) COMMAND | ~514 |

| CAUSE EXECUTION OF THE GENERATED API COMMAND | ~516 |

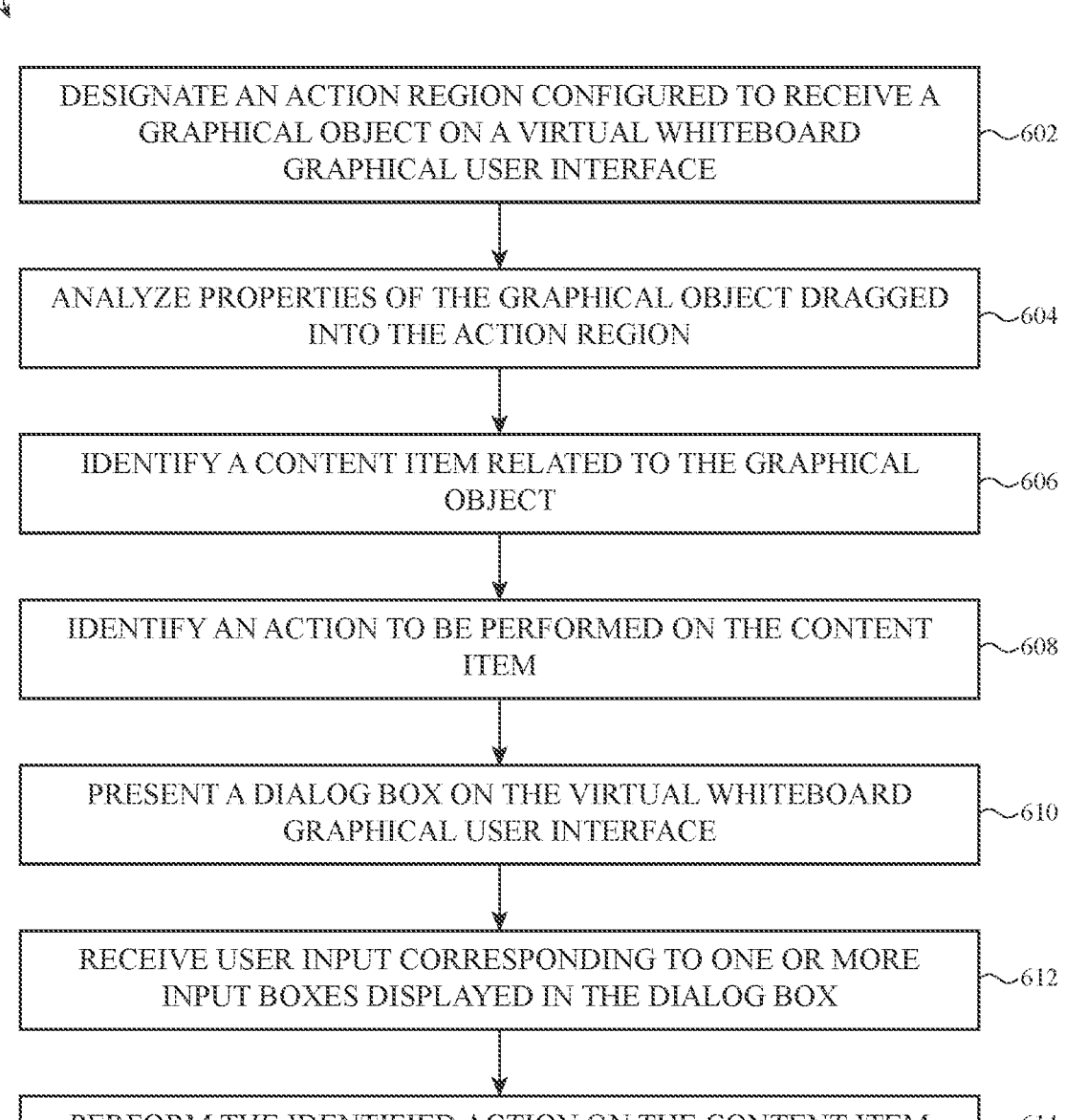

DESIGNATE AN ACTION REGION CONFIGURED TO RECEIVE A GRAPHICAL OBJECT ON A VIRTUAL WHITEBOARD GRAPHICAL USER INTERFACE ~602

ANALYZE PROPERTIES OF THE GRAPHICAL OBJECT DRAGGED INTO THE ACTION REGION ~604

IDENTIFY A CONTENT ITEM RELATED TO THE GRAPHICAL OBJECT ~606

IDENTIFY AN ACTION TO BE PERFORMED ON THE CONTENT ITEM ~608

PRESENT A DIALOG BOX ON THE VIRTUAL WHITEBOARD GRAPHICAL USER INTERFACE ~610

RECEIVE USER INPUT CORRESPONDING TO ONE OR MORE INPUT BOXES DISPLAYED IN THE DIALOG BOX ~612

PERFORM THE IDENTIFIED ACTION ON THE CONTENT ITEM ~614

FIG. 6

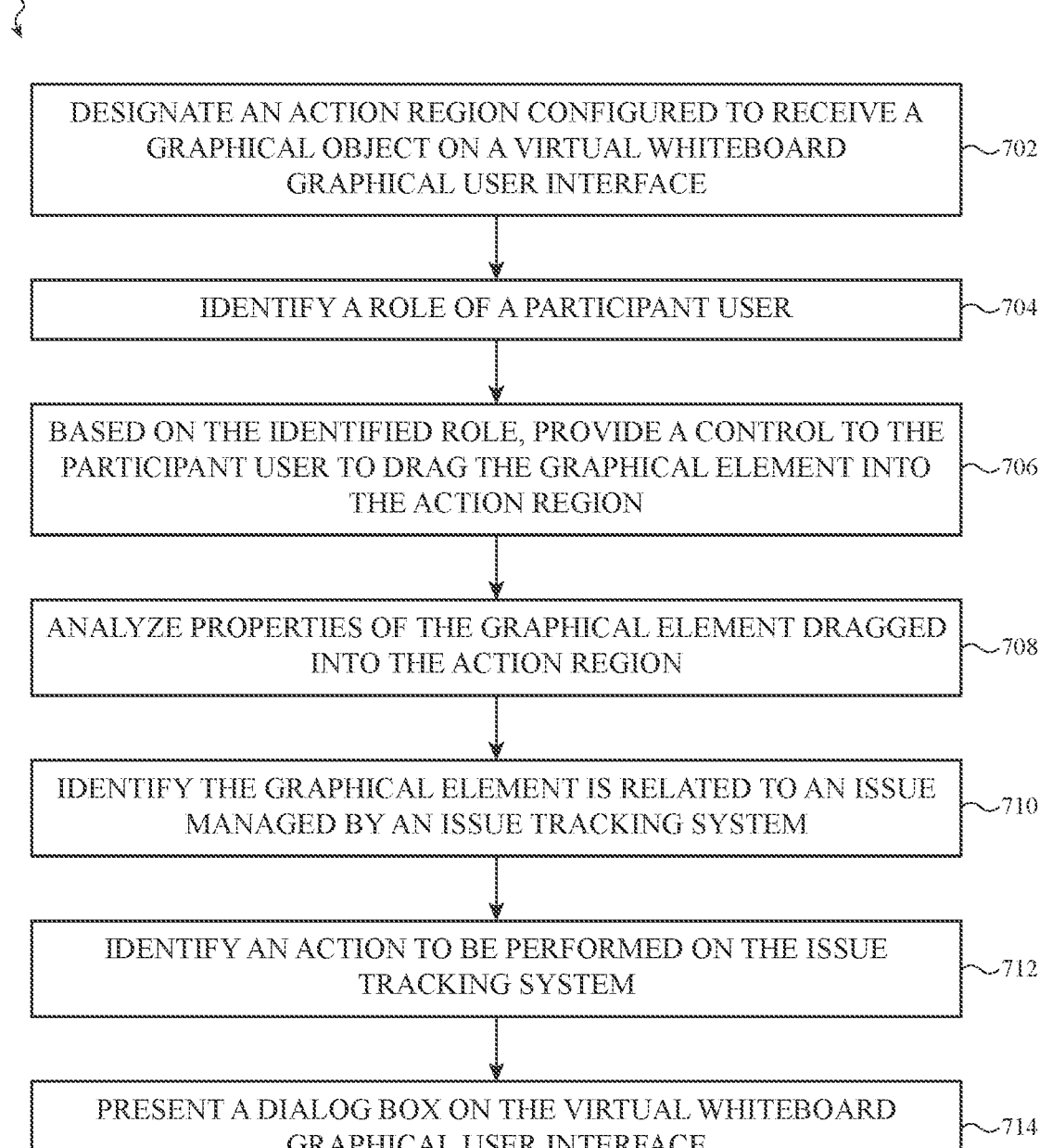

700

DESIGNATE AN ACTION REGION CONFIGURED TO RECEIVE A GRAPHICAL OBJECT ON A VIRTUAL WHITEBOARD GRAPHICAL USER INTERFACE — 702

IDENTIFY A ROLE OF A PARTICIPANT USER — 704

BASED ON THE IDENTIFIED ROLE, PROVIDE A CONTROL TO THE PARTICIPANT USER TO DRAG THE GRAPHICAL ELEMENT INTO THE ACTION REGION — 706

ANALYZE PROPERTIES OF THE GRAPHICAL ELEMENT DRAGGED INTO THE ACTION REGION — 708

IDENTIFY THE GRAPHICAL ELEMENT IS RELATED TO AN ISSUE MANAGED BY AN ISSUE TRACKING SYSTEM — 710

IDENTIFY AN ACTION TO BE PERFORMED ON THE ISSUE TRACKING SYSTEM — 712

PRESENT A DIALOG BOX ON THE VIRTUAL WHITEBOARD GRAPHICAL USER INTERFACE — 714

EXECUTE AN APPLICATION PROGRAMMING INTERFACE CALL TO THE ISSUE TRACKING SYSTEM TO PERFORM THE IDENTIFIED ACTION IN ACCORDANCE WITH USER INPUT CORRESPONDING TO A PLURALITY OF FIELDS DISPLAYED IN THE DIALOG BOX — 714

*FIG. 7*

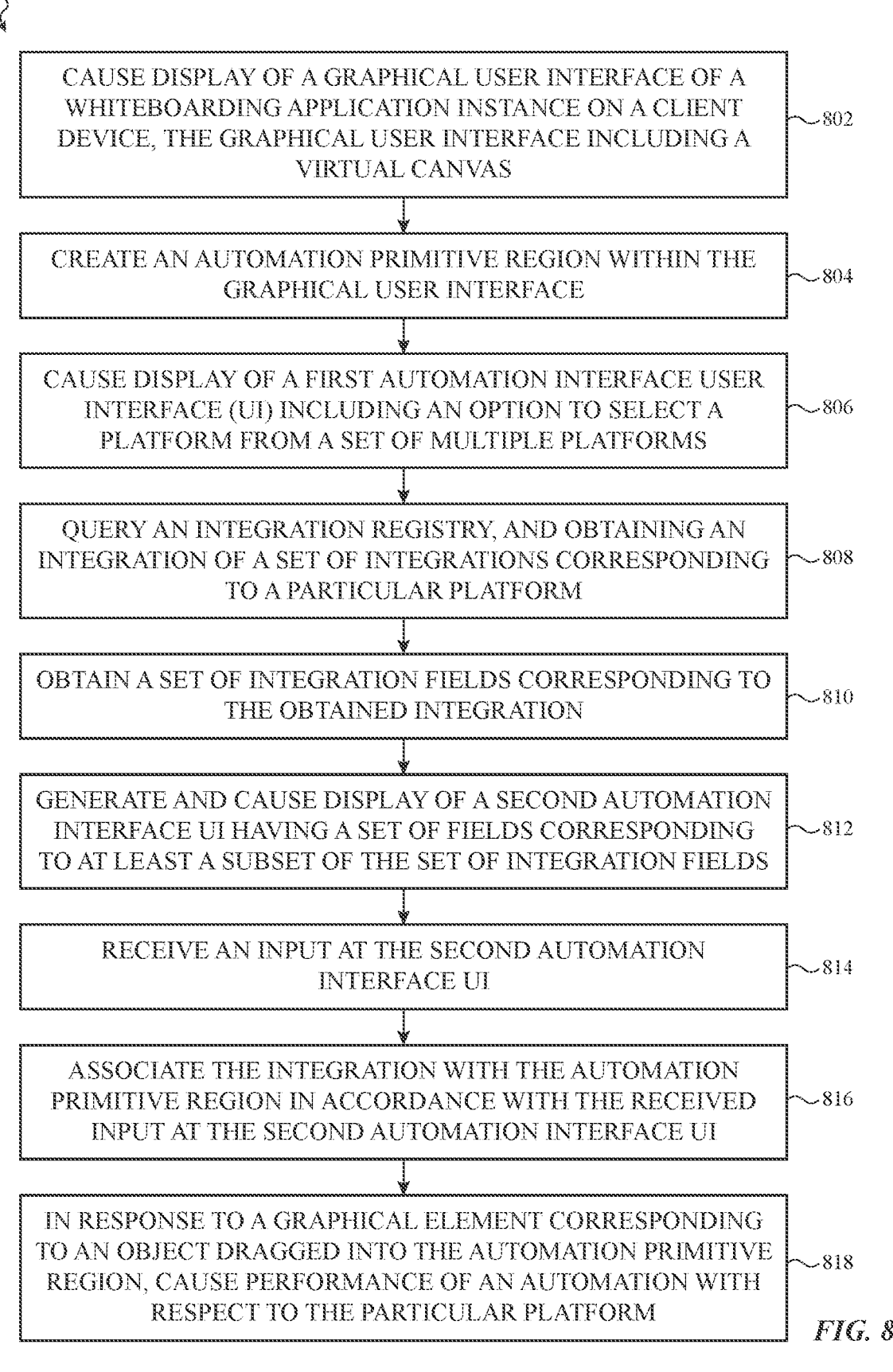

800

CAUSE DISPLAY OF A GRAPHICAL USER INTERFACE OF A WHITEBOARDING APPLICATION INSTANCE ON A CLIENT DEVICE, THE GRAPHICAL USER INTERFACE INCLUDING A VIRTUAL CANVAS ~802

CREATE AN AUTOMATION PRIMITIVE REGION WITHIN THE GRAPHICAL USER INTERFACE ~804

CAUSE DISPLAY OF A FIRST AUTOMATION INTERFACE USER INTERFACE (UI) INCLUDING AN OPTION TO SELECT A PLATFORM FROM A SET OF MULTIPLE PLATFORMS ~806

QUERY AN INTEGRATION REGISTRY, AND OBTAINING AN INTEGRATION OF A SET OF INTEGRATIONS CORRESPONDING TO A PARTICULAR PLATFORM ~808

OBTAIN A SET OF INTEGRATION FIELDS CORRESPONDING TO THE OBTAINED INTEGRATION ~810

GENERATE AND CAUSE DISPLAY OF A SECOND AUTOMATION INTERFACE UI HAVING A SET OF FIELDS CORRESPONDING TO AT LEAST A SUBSET OF THE SET OF INTEGRATION FIELDS ~812

RECEIVE AN INPUT AT THE SECOND AUTOMATION INTERFACE UI ~814

ASSOCIATE THE INTEGRATION WITH THE AUTOMATION PRIMITIVE REGION IN ACCORDANCE WITH THE RECEIVED INPUT AT THE SECOND AUTOMATION INTERFACE UI ~816

IN RESPONSE TO A GRAPHICAL ELEMENT CORRESPONDING TO AN OBJECT DRAGGED INTO THE AUTOMATION PRIMITIVE REGION, CAUSE PERFORMANCE OF AN AUTOMATION WITH RESPECT TO THE PARTICULAR PLATFORM ~818

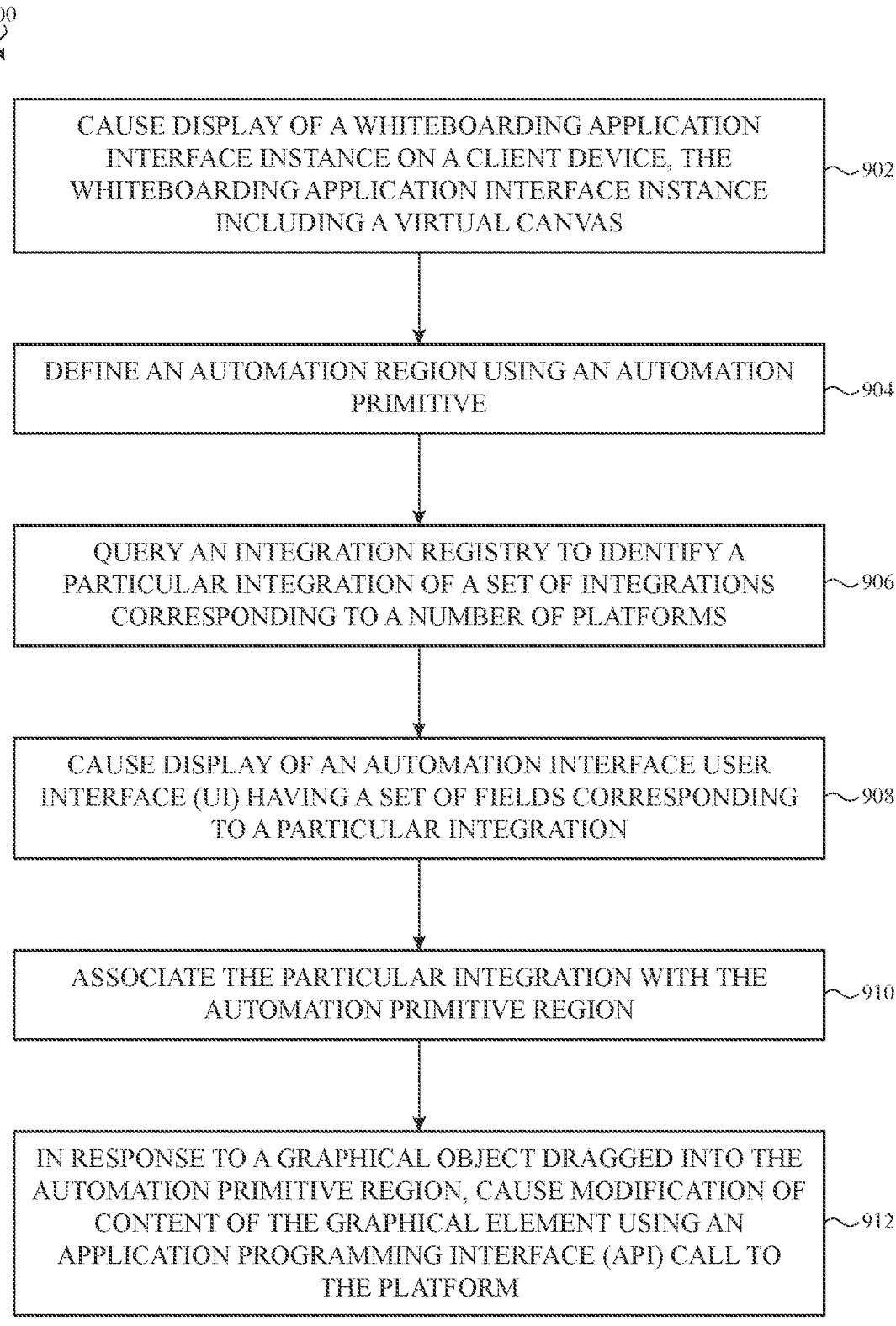

CAUSE DISPLAY OF A WHITEBOARDING APPLICATION INTERFACE INSTANCE ON A CLIENT DEVICE, THE WHITEBOARDING APPLICATION INTERFACE INSTANCE INCLUDING A VIRTUAL CANVAS ~902

DEFINE AN AUTOMATION REGION USING AN AUTOMATION PRIMITIVE ~904

QUERY AN INTEGRATION REGISTRY TO IDENTIFY A PARTICULAR INTEGRATION OF A SET OF INTEGRATIONS CORRESPONDING TO A NUMBER OF PLATFORMS ~906

CAUSE DISPLAY OF AN AUTOMATION INTERFACE USER INTERFACE (UI) HAVING A SET OF FIELDS CORRESPONDING TO A PARTICULAR INTEGRATION ~908

ASSOCIATE THE PARTICULAR INTEGRATION WITH THE AUTOMATION PRIMITIVE REGION ~910

IN RESPONSE TO A GRAPHICAL OBJECT DRAGGED INTO THE AUTOMATION PRIMITIVE REGION, CAUSE MODIFICATION OF CONTENT OF THE GRAPHICAL ELEMENT USING AN APPLICATION PROGRAMMING INTERFACE (API) CALL TO THE PLATFORM ~912

*FIG. 9*

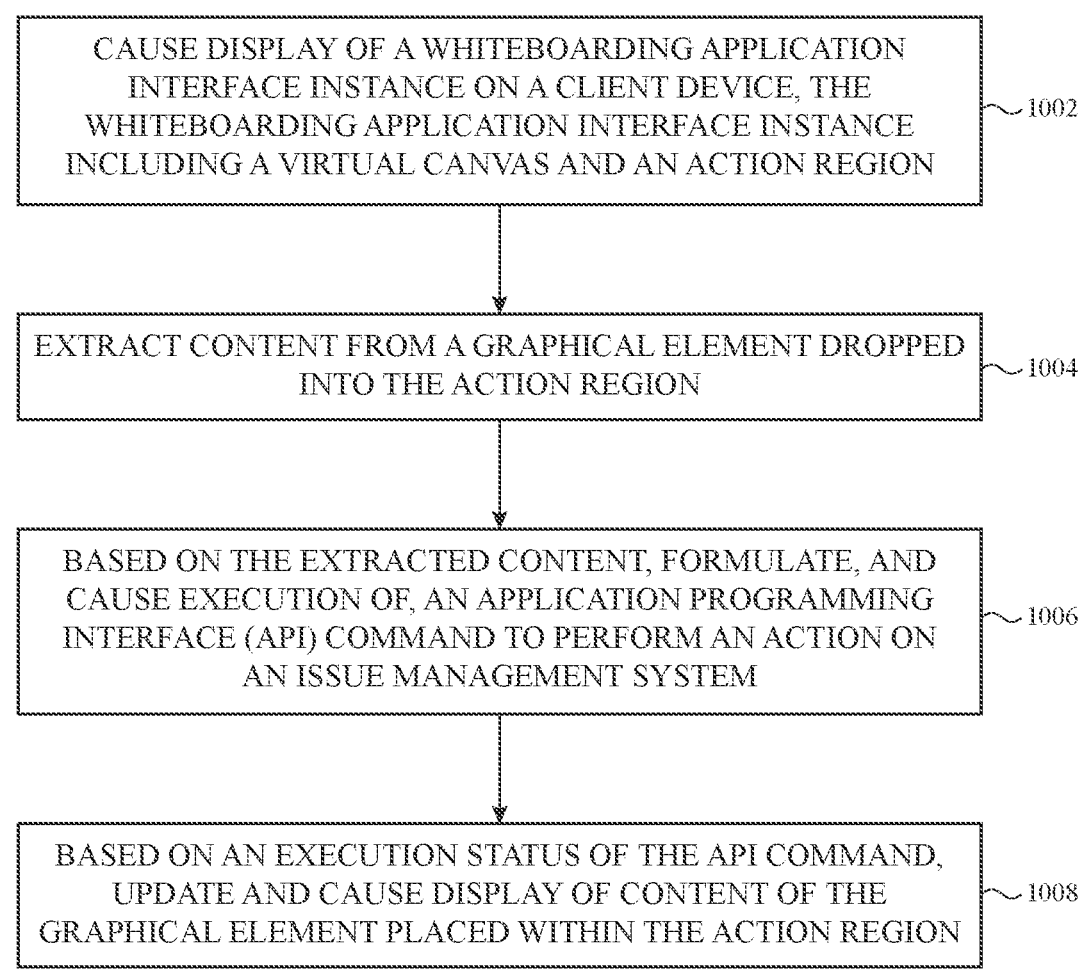

1000

CAUSE DISPLAY OF A WHITEBOARDING APPLICATION INTERFACE INSTANCE ON A CLIENT DEVICE, THE WHITEBOARDING APPLICATION INTERFACE INSTANCE INCLUDING A VIRTUAL CANVAS AND AN ACTION REGION ~ 1002

EXTRACT CONTENT FROM A GRAPHICAL ELEMENT DROPPED INTO THE ACTION REGION ~ 1004

BASED ON THE EXTRACTED CONTENT, FORMULATE, AND CAUSE EXECUTION OF, AN APPLICATION PROGRAMMING INTERFACE (API) COMMAND TO PERFORM AN ACTION ON AN ISSUE MANAGEMENT SYSTEM ~ 1006

BASED ON AN EXECUTION STATUS OF THE API COMMAND, UPDATE AND CAUSE DISPLAY OF CONTENT OF THE GRAPHICAL ELEMENT PLACED WITHIN THE ACTION REGION ~ 1008

*FIG. 10*

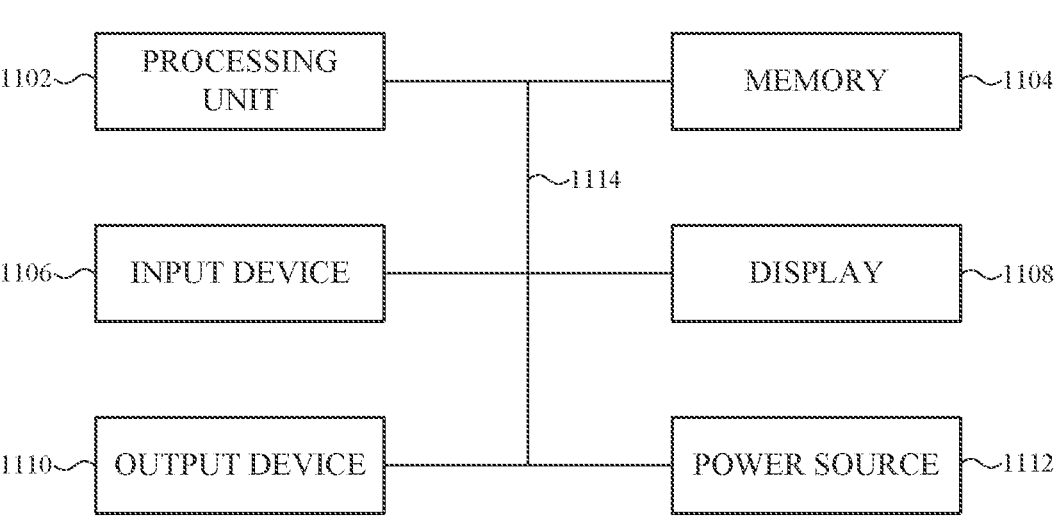
*FIG. 11*

CONFIGURABLE VIRTUAL WHITEBOARD GRAPHICAL USER INTERFACE WITH AUTOMATION REGIONS

CROSS-REFERENCE TO RELATED APPLICATION

This application is a nonprovisional and claims the benefit under 35 U.S.C. § 119(e) of U.S. Provisional Patent Application No. 63/435,972, filed Dec. 29, 2022, the contents of which are incorporated herein by reference as if fully disclosed herein.

FIELD

The described embodiments relate to systems and methods providing a virtual whiteboard application having a virtual canvass to a group of users during a whiteboarding session. In particular, the present embodiments relate to an automation primitive or a user-defined region that can be used to generated automated action with respect to graphical objects positioned on the virtual canvas.

BACKGROUND

Modern enterprises and collaboration platforms typically enable a group of users to collaborate with each other, for example, using electronic documents or other shared media. However, such structured media can make it difficult to collaborate with multiple users concurrently or in a shared session. The systems and techniques described herein may be used to define a contemporaneous electronic collaboration system that can interface with other applications or platforms. In particular, the examples and techniques described herein can be used to generate user-defined automations that can be performed on objects created in a virtual whiteboard application.

SUMMARY

The embodiments and examples described herein are directed to computer systems and computer-implemented methods for enabling collaboration among a group of users in a whiteboarding session using a virtual whiteboard graphical user interface. As described herein, the system may include a backend configured to provide or enable collaboration among the group of users using a virtual whiteboard graphical user interface, which is displayed on a client device of each participant user of a group of users during a whiteboarding session, and perform a particular action on an external platform in accordance with a received user input and/or a user action performed on the virtual whiteboard graphical user interface. The external platform, for example, may be an issue tracking platform, or a content management system. The particular action performed on the external platform may include, for example, creating a new issue on the issue tracking platform, searching the issue tracking platform according to search criteria, updating a status of an issue managed by the issue tracking platform, creating a new content item on the content management system, searching the content management system according to search criteria, and so on.

The embodiments and examples described herein are directed to computer systems and computer-implemented methods for enabling automation in a whiteboarding session using a graphical user interface of a whiteboarding application instance. As described herein, the system may include a backend configured to provide or enable automation using the graphical user interface of the whiteboarding application instance executing on a client device. The whiteboarding application instance is launched and executed during collaboration among a group of users during a whiteboarding session to perform a particular automation with respect to an external platform in accordance with a received user input and/or a user action performed on the virtual whiteboard graphical user interface. The external platform, for example, may be an issue tracking platform, a document management system, or a content management system, and so on. The particular action performed on the external platform may include, for example, creating a new issue on the issue tracking platform, searching the issue tracking platform according to search criteria, updating a status of an issue managed by the issue tracking platform, creating a new content item on the content management system, searching the content management system according to search criteria, and so on.

One or more automation primitives may be created and define an automation region or action region the graphical user interface of the whiteboarding application instance. Each of the one or more automation regions are configured to perform a particular automation or action with respect a specific external platform that may be tracked using an integration registry. In some implementations, two or more automation regions can be linked with each other to perform a series of automations or actions with respect to one or more different external platforms. The integration registry provides details of a particular action to be performed with respect to an external platform based on specific inputs. The specific inputs are extracted from user-defined content in a graphical object (or a note object) dragged and dropped in an automation region, or received from a user as user input to one or more fields of a user interface (e.g., a second automation interface user interface (UI)), which fields are determined and displayed in accordance with the integration registry.

In one embodiment, a computer-implemented method for generating automated actions in a virtual whiteboard graphical user interface of a content collaboration platform is disclosed. The method includes causing display of the virtual whiteboard graphical user interface including a virtual canvas including a set of user-defined graphical objects containing user-generated content. The set of user-defined graphical objects is generated in response to input received from multiple users participating in a whiteboarding session. The method includes receiving a first user input from a first user of the multiple users designating an automation primitive or other user-defined region within the virtual canvas. The user-defined region may be associated with an issue tracking platform that is distinct from the whiteboard application. The method may include receiving a second user input from the first user assigning an action to the user-defined region, and a third user input from the first user selecting a graphical object of a plurality of graphical objects positioned within the virtual canvas and dragging or positioning the graphical object into the user-defined region. The method may include extracting content from the graphical object in response to the graphical object being placed within the user-defined region. In some instances, the method also includes generating a proposed action to be performed with respect to the issue tracking platform or other external platform and causing display of an interface window including a preview of the proposed action. In response to a confirmation input, the system may generate an application programming interface (API) command including at least a portion of the extracted content and an API action corresponding to the action assigned to the action region. The system may then cause the API command to be processed by the issue tracking platform or other respective external platform.

In another embodiment, a computer-implemented method for generating automated actions in a virtual whiteboard graphical user interface of a content collaboration platform is disclosed. The method includes causing display of the virtual whiteboard graphical user interface including a virtual canvas, which further including a set of user-defined graphical objects containing user-generated content. The set of user-defined graphical objects is generated in response to input received from multiple users participating in a whiteboarding session. The method includes receiving a first user input from a first user of the multiple users designating an action region within the virtual canvas. The action region is associated with an issue tracking platform that is distinct form the content collaboration platform. The method includes receiving a second user input from the first user selecting a graphical object of a plurality of graphical objects positioned within the virtual canvas and dragging or positioning the graphical object into the action region. The method includes extracting content from the graphical object in response to the graphical object being placed within the action region. The method may also include causing display of an interface window including a preview of the extracted content. In response to a confirmation input, the system may generate an application programming interface (API) command including at least a portion of the extracted content, and an API action corresponding to the action associated with the action region, and causing the API command to be processed by the issue tracking platform.

In yet another embodiment, a computer-implemented method for generating automated actions in a virtual whiteboard graphical user interface of a content collaboration platform is disclosed. The method includes causing display of the virtual whiteboard graphical user interface including a virtual canvas including a set of user-defined graphical objects containing user-generated content. The set of user-defined graphical objects is generated in response to input received from multiple users participating in a whiteboarding session. The method may include receiving a first user input from a first user of the multiple users designating a user-defined action region or automation region within the virtual canvas. The user-defined action region associated with a content management service of the content collaboration platform. The method includes receiving a second user input from the first user assigning an action to the action region, and a third user input from the first user selecting a graphical object of a plurality of graphical objects positioned within the virtual canvas and dragging the graphical object into the user-defined action region. The method includes extracting content from the graphical object in response to the graphical object being placed within the user-defined action region and generating a proposed action to be performed with respect to the content management service. The method includes causing display of an interface window including a preview of the proposed action, and in response to a confirmation input, performing the action assigned to the action region.

In yet another embodiment, a computer-implemented method is disclosed. The method includes causing display of a graphical user interface of a whiteboarding application instance on a client device. The graphical user interface of the whiteboarding application instance includes a virtual canvas configured to contemporaneously receive one or more object creation commands from one or more client devices operably coupled to a whiteboarding service platform executing on a whiteboarding backend. The method includes creating an automation region within the graphical user interface of the whiteboarding application instance in response to a first user input, and causing display of a first automation interface user interface (UI) including an option to select a platform from a set of multiple platforms in response to a second user input. The method includes querying an integration registry in response to a selection of a particular platform from the set of multiple platforms, and obtaining an integration of a set of integrations corresponding to the particular platform. The method includes obtaining a set of integration fields in accordance with the obtained integration corresponding to the particular platform, and generating and causing display of a second automation interface UI having a set of regions corresponding to at least a subset of the set of integration fields. The method includes receiving an input at the second automation interface UI, and in accordance with received input at the second automation interface UI, associating the integration with the automation region. The method includes causing performance of an automation with respect to the particular platform in response to a graphical object corresponding to an object dragged into the automation region.

In yet another embodiment, a computer-implemented method is disclosed. The method includes causing display of a whiteboarding application interface instance on a client device. The whiteboarding application interface instance includes a virtual canvas configured to contemporaneously receive one or more object creation commands from one or more client devices operably coupled to a whiteboarding service platform executing on a whiteboarding backend. The method includes defining a portion of the virtual canvas as an automation region in response to a first user input, and querying an integration registry to identify a particular integration of a set of integrations corresponding to a number of platforms. The method includes, in accordance with the identified particular integration corresponding to a platform of the number of platforms, causing display of an automation interface user interface (UI) having a set of fields. The set of fields corresponds to the particular integration. The method includes, in accordance with user inputs corresponding to the set of fields, associating the particular integration with the automation region. The method includes, in response to a graphical object corresponding to an object dragged into the automation region, causing modification of content of the graphical object using an application programming interface (API) call to the platform.

In yet another embodiment, a computer-implemented method is disclosed. The method includes causing display of a whiteboarding application interface instance on a client device. The whiteboarding application interface instance includes a multi-user editable region (e.g., virtual canvas) and an action region (e.g., automation region). The multi-user editable region and the action region are configured to contemporaneously receive one or more object creation commands from one or more client devices operably coupled to a whiteboarding service platform executing on a whiteboarding backend. The method includes, in response to a graphical object of a set of user-defined graphical objects positioned within the multi-user editable region being dragged and dropped into the action region, extracting content from the graphical object dropped into the action region, and based on the extracted content, formulating, and causing execution of, an application programming interface (API) command to perform an action on an issue management system. The method includes, in accordance with an execution status of the API command, updating and displaying of content of the graphical object placed within the action region. The updated content of the graphical object includes a selectable graphical object corresponding to an issue managed by the issue management system. The selectable graphical object is a selectable graphical object and displays data extracted from an object managed by the issue management system upon selection of the selectable graphical object by a user of the client device.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 5 depicts a first example flow chart of a process for collaboration among the group of users using a virtual whiteboard graphical collaboration interface, in accordance with some embodiments.

FIG. 6 depicts a second example flow chart of a process for collaboration among the group of users using a virtual whiteboard graphical collaboration interface, in accordance with some embodiments.

FIG. 7 depicts a third example flow chart of a process for collaboration among the group of users using a virtual whiteboard graphical collaboration interface, in accordance with some embodiments.

FIG. 8 depicts a first example flow chart of a process for automation using a whiteboarding application interface instance, in accordance with some embodiments.

FIG. 9 depicts a second example flow chart of a process for automation using a whiteboarding application interface instance, in accordance with some embodiments.

FIG. 10 depicts a third example flow chart of a process for automation using a whiteboarding application interface instance, in accordance with some embodiments.

FIG. 11 depicts an example hardware for devices of the systems described herein.

The use of the same or similar reference numerals in different figures indicates similar, related, or identical items.

Figure 1:
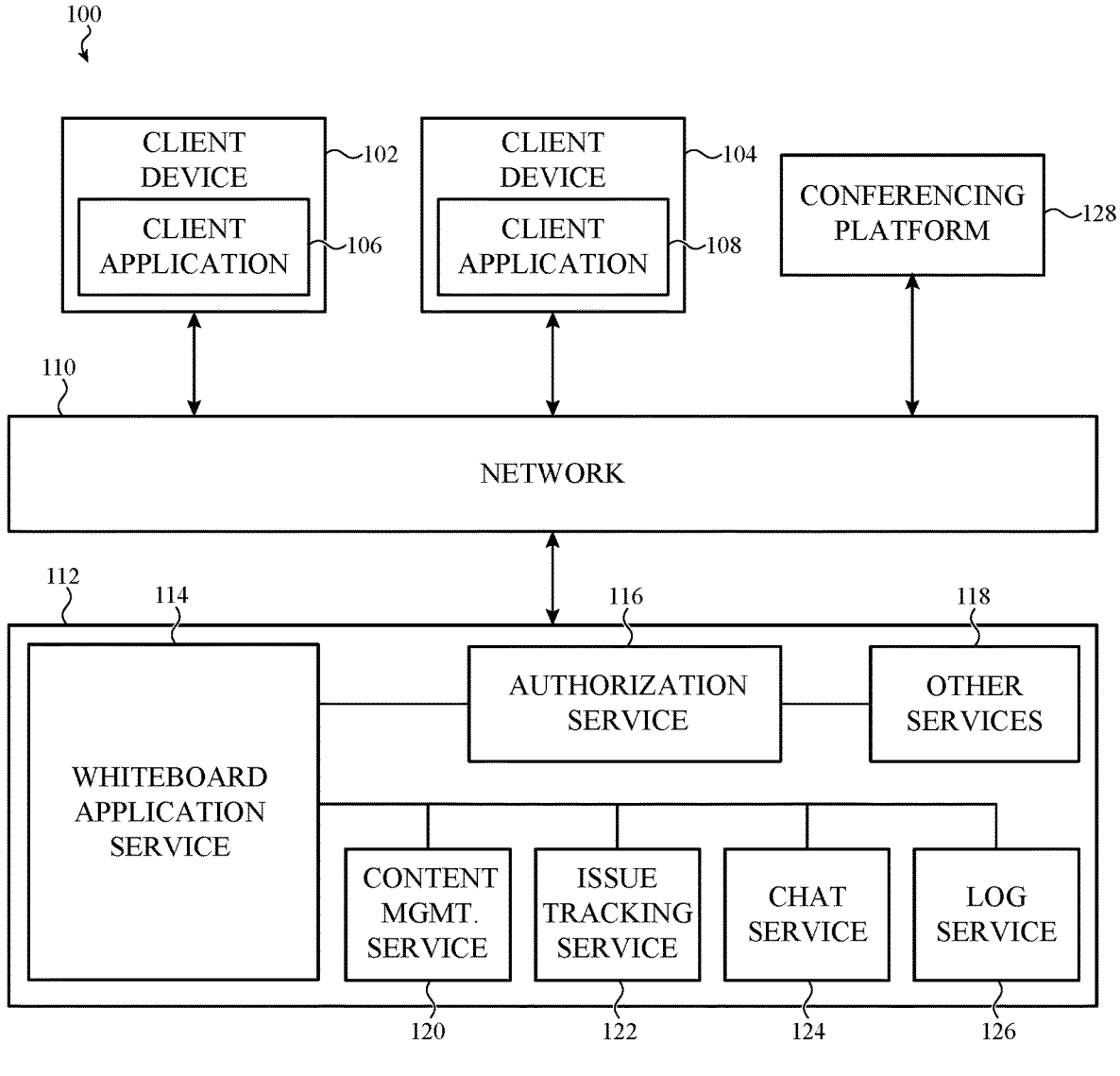
FIG. 1 depicts a system for collaboration among a group of users in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The systems and techniques described herein are directed to improvement of a virtual whiteboard graphical collaboration interface during a whiteboarding session among a group of users. The virtual whiteboard graphical user interface may provide a virtual board also referred to as a virtual canvas during a whiteboarding session, which may be an online or a virtual whiteboarding session, to share ideas, notes, tasks to be completed or assigned as discussed during the whiteboarding session. Unlike many traditional digital files, users can contribute to the canvas contemporaneously, which improves virtual collaboration during a multi-user whiteboarding session. The virtual canvas also allows users to move and/or shift content within the digital canvas without having to erase work or generate multiple pages or documents. Similarly, collaborative sessions in whiteboard applications can be saved for later reference.

The systems and techniques described herein may be applicable to what may be generally referred to as a content collaboration platform. The content collaboration platform may also be used as a conferencing platform and may provide a virtual audiovisual meeting functionality to a group of users. In some cases, the whiteboard application or other aspects of the content collaboration platform is shared as part of a videoconference or other virtual conferencing session provided by a separate videoconferencing service that allows for audio and/or video communication between participants of the session. Participant users of the whiteboarding session may create graphical objects, which may be referred herein as user-defined graphical objects including user-generated content. By way of an example, the user-defined graphical objects may be similar to sticky notes, a participant user may generate and place a user-defined graphical object on the virtual whiteboard graphical user interface in a virtual canvas.

The whiteboard application has an unstructured canvas region which allows for shared editing capabilities. For example, multiple users can concurrently edit, add graphical objects, delete items, move items, and so on. As described herein, the unstructured canvas region is a virtual canvas that can be expanded in any direction within the 2D plane of the canvas. For example, the editor region or canvas extends as users add more content. Because the canvas region is unstructured, it allows graphical objects and/or any other content to be placed anywhere within the region. In other words, the canvas region allows users to place content without grid restrictions, margins, or size limitations (e.g., freeform). As a result of this configuration, during a video conference, team members may concurrently collaborate (e.g., on a project) similar to collaboration using whiteboards in traditional physical meeting rooms. As used herein, the terms "virtual canvas," "multi-user editable canvas," "editable canvas," "multi-user editable region," or "canvas" may be used interchangeably to refer to the unstructured canvas region used to facilitate multi-user whiteboard collaboration sessions.

While the virtual whiteboard application provides a variety of user-defined objects or primitives, it may be difficult to export or translate items created in the virtual whiteboard to other external platforms or systems. As described herein, a user may generate or select an automation primitive or action primitive that creates an automation region or action region within the virtual canvas. The terms "automation primitive." "action primitive." and "user-defined action primitive" are used interchangeably throughout this present disclosure. Similarly, the terms "automation region," "action region," and user-defined action region" are also used interchangeably throughout the specification. As described in more detail in the examples below, a user may position various graphical objects (e.g., virtual notes or other user-generated content items) into an automation primitive region, which may be configured to perform a particular action or automation with respect to the whiteboarding application and/or with respect to an external platform.

In general, as described herein, in accordance with some embodiments, the action to be performed is automatically determined, and executed on systems like an issue tracking platform, a content management system, and so on. Accordingly, the embodiments described in the present disclosure allow for the automatic translation and export of items in the whiteboard application to an external platform. Additionally, or alternatively, a user can configure a specific automation to be performed with respect to one or more external platforms while working individually or collaborating with other users. Further, the specific automation may include two or more automated actions with respect to one or more external platforms, and thereby, improving efficiency of its users. The external platforms as described herein may include, but not limited to, an issue management system, a document management system, a content management system, and so on.

These foregoing and other embodiments are discussed below with reference to FIGS. 1, 2A-2E, 3A-3B, 4A-4G, and 5-12. However, those skilled in the art will readily appreciate that the detailed description given herein with respect to these figures is for explanation only and should not be construed as limiting.

FIG. 1 depicts a simplified diagram of a content collaboration system, as described herein. A system 100, which may be used to implement a content collaboration system, is depicted as implemented in a client-server architecture or client-service architecture, but it may be appreciated that this is merely one example and that other communications architectures are possible. In accordance with the examples provide herein, the system 100 of FIG. 1 can be used for collaboration among a group of users using a virtual whiteboard graphical user interface, and executing an action with respect to an external platform, such as an issue tracking platform, a content management system, and so on, via a computer network. All or portions of the system 100 may be referred to as a content collaboration system or collaboration system, as used herein.

An architecture of the collaboration system 100 may allow participant users of a whiteboarding session to share their ideas with other users, create one or more actions to be performed with respect to an issue being managed by an issue tracking platform, or a content item being managed by a content management system, and automatically cause execution of one or more actions with respect to the issue tracking platform and/or the content management system. By way of a non-limiting example, an automatic execution of the one or more actions with respect to the issue tracking platform and/or the content management system is performed as a participant user drags or otherwise positions a graphical object on a virtual canvas where the graphical object is currently placed by the participant user into or on an automation or action region, which may be a user-defined action region, of the virtual whiteboard graphical user interface displayed on the participant user's client device.

The networked computer system or the content collaboration system 100 of FIG. 1 depicts an example configuration in which multiple client devices 102, and 104 may access a host server 112 of a set of host servers via a computer network 110. The host server 112 may be referred herein as a collaboration platform server 112. The computer network 110 may include a distributed network which may include local networks, gateways, and networking services provided by one or more internet service providers. The client devices 102, and 104 are able to collaborate with each other and other users using a conferencing platform 128, and the collaboration platform server 112 providing a whiteboarding application service 114. In the present example, the conferencing platform 128 is depicted as being separate from the server 112, in some instances, some or all of the services of the conferencing platform may be integrated with or provided by a service operating on the platform server 112.

In general, the conferencing platform 128 may provide audio, video, and/or audiovisual conferencing services. The conferencing platform 128 may also be used to share a single instance of a whiteboard application being executed on a client device as a frontend of the application in conjunction with the backend provided by the whiteboard application service 114. The conferencing platform 128 may share a single instance of the whiteboard application, while the backend whiteboard application service 114 concurrently provides the same whiteboard session to multiple client devices. As a result, the participants in a videoconference or telephone conference provided by the conferencing platform 128 may be the same (or have participants in common) with participants of a whiteboarding session. The conferencing platform 128 may also provide other services including scheduling of a whiteboarding session and/or scheduling of an online conference or meeting, initiating and/or terminating the whiteboarding session, the online conference or meeting, recording of the whiteboarding session, and/or recording of the online conference or meeting, and other services. In some embodiments, a service executing on the collaboration platform server 112 may also provide the same functionalities to the participant users, and thus a separate conferencing platform 128 may not be required.

The whiteboarding application service 114 may display a virtual board or virtual canvas in a virtual whiteboard graphical user interface displayed on a display of each of the client devices 102, and 104, and a participant user can collaborate using the whiteboarding application service 114 via the network 110 either directly or through the other services by the collaboration platform server 112. Additionally, or alternatively, the whiteboarding application service 114 may allow or enable a user of a client device to work individually and perform automation with respect to one or more external platforms, as described herein. Accordingly, the collaboration platform server 112 of the set of host servers may include multiple platform services, which may be part of the content collaboration system 100. For example, the multiple platform services may include, but not limited to, a content management service 120, an issue tracking service 122, a chat service 124, a logging service 126, an authorization service 116, and other services 118, and so on. A platform service of the multiple platform services may be implemented as one or more instances of the platform service executing on one or more host servers of the set of host servers. The multiple platform services may also provide different services including, for example, issue tracking services for creating, managing, and tracking issues for software development, bug tracking, content management services for creating, managing, and searching content items, and/or information technology service management (ITSM) services. Also, while the various platform services 120, 122, 124, 126, and 118, and so on, are all depicted as being provided by the same server 112 or set of servers, each of the platforms may be implemented on a separate server that is distinct from the server 112. Depending on the implementation and the platform provider, the various platforms 120, 122, 124, 126, and 118, and so on, may be provided by a third party and may be referred to as third-party platforms.

The client devices 102, 104 execute or operate respective example client applications 106, 108, which may include a dedicated client-side application or may be a web browser client application. The client applications 106, 108 may also be referred to herein as frontend applications and may provide one or more graphical user interfaces, for example, virtual whiteboard graphical user interfaces, for interfacing with the backend applications or services provided by the host server 112. The client devices 102, 104 typically include at least one display, at least one processing unit, at least one computer memory, and other hardware components. An example device including hardware elements is described below with respect to FIG. 11.

The frontend applications 106, 108 executing on the client devices 102, 104, respectively, may also be referenced herein as a whiteboard application, whiteboard frontend or a whiteboarding application instance, and may display a virtual whiteboard graphical user interface (or a graphical user interface of a whiteboarding application instance) according to example views shown in FIGS. 2A-2E, 3A-3B, and 4A-4G, as discussed below. A participant user can create a graphical object (also referred herein as a user-defined graphical object), having properties, for example, a text and/or an icon, on the virtual whiteboard graphical user interface using the whiteboarding application service 114 during a whiteboarding session. Each graphical object may further have properties including a shape, a size, and/or a color in which the graphical object is displayed on the virtual whiteboard graphical user interface on the client devices 102, and 104. The properties of the graphical object may be visible properties to participant users of the whiteboarding session in accordance with a permission granted to each participant user based on their respective user profile.

In some embodiments, and by way of a non-limiting example, properties of each graphical object may uniquely identify a participant user who created the graphical object. Additionally, or alternatively, the properties of the graphical object may uniquely identify whether the graphical object corresponds to a graphical object associated with an issue managed by an issue tracking platform, or a graphical object associated with a content item managed by a content management system. For example, graphical objects created by a participant user User-A may each be of red color, while graphical objects created by a participant user User-B may each be of blue color, or graphical objects associated with an issue managed by an issue tracking platform may be of a square shape and graphical objects associated with a content item managed by a content management system may be of a rectangle shape.

A participant user of the whiteboarding session and/or a host of the whiteboarding session may configure properties of the graphical object, for example, the shape, the size, and the color for each graphical object, according to various criteria as described herein. In some cases, the graphical objects may be created from object primitives or templates that preconfigure the object to a particular form or media type. Example object primitives include, note primitives, text primitives, emoji or sticker primitives, shape primitives, connector primitives, and automation or action primitives, as described herein. For example, the participant user of the whiteboarding session and/or the host of the whiteboarding session may designate one or more action regions using an action or automation primitive, and configure rules to perform one or more actions and/or automations when a participant user of the whiteboarding session moves a graphical object into the respective action or automation region. An action or automation region, as described herein, may be a user-defined action region, or a pre-defined action region that is added by a participant user or a host user of the whiteboarding session for display on the virtual whiteboard graphical user interface. Properties of the pre-defined action region may be preconfigured and may not be updated by the participant user or the host user of the whiteboarding session. However, properties of the user-defined action region may be dynamically updated by the participant user or the host user of the whiteboarding session. The action region is displayed on the virtual whiteboard graphical user interface as distinct from the virtual canvas displayed on the virtual whiteboard graphical user interface.

Accordingly, participant users can collaborate using a virtual whiteboard, which is presented on a display of each client device as a virtual whiteboard graphical user interface, and automatically cause execution of an action according to the configured rules of an action region, when a participant user places a graphical object into the action region of the virtual whiteboard graphical user interface. As described herein, the virtual whiteboard graphical user interface is displayed on a client device as a user of the client device launches an instance of a whiteboarding application on the client device to work individually to perform some automation with respect to one or more external platforms, and/or to collaborate with other users using the whiteboarding application. The participant user may place the graphical object into the action region by dragging the graphical object from its current location in the virtual canvas on the virtual whiteboard graphical user interface to any place within the action region on the virtual whiteboard graphical user interface. Additionally, or alternatively, the participant user may edit properties of the graphical object corresponding to a display location of the graphical object on the virtual whiteboard graphical user interface to move the graphical object from the virtual canvas into the action region.

In some embodiments, and by way of a non-limiting example, the rules to perform one or more actions when a graphical object is moved into an action region may be based on a particular action configured for the action region by a participant user or a host user of the whiteboarding session. For example, a virtual whiteboard graphical user interface may include a first action region and a second action region. The first action region may be configured to open a new issue that is associated with the moved graphical object into the first action region on the issue tracking platform, and the second action region may be configured to set a status of an issue associated with the moved graphical object to a closed state when a graphical object is moved into the second action region. An application programming interface call to an issue tracking platform, using the issue tracking service 122, may be made to perform the configured action corresponding to an action region on the issue tracking platform.

Additionally, or alternatively, an action to be performed when a graphical object is moved or dragged into an action region may be determined based on parsing text and/or icons displayed corresponding to the graphical object. The parsed text and/or icons then may be compared using the parsed text and/or icon as a key to a list of key-value pairs, where an action to be performed is identified as a value of the key-value pair. For example, the parsed text may include "new issue" and the list of key-value pairs may include an entry ("new issue," "create a new issue in an issue tracking platform"). Accordingly, when a graphical object including text, for example, "new issue." is moved into an action region, an application programming interface call to an issue tracking platform, using the issue tracking service 122, may be made to open a new issue on the issue tracking platform.

In some embodiments, and by way of a non-limiting example, the list of key-value pairs may include ("search issue", "search an issue tracking platform"), ("list issue", "display an issue of the issue tracking platform"), ("change status", "update a status of an issue on the issue tracking platform"), ("new page", "generate a new document on a content management system"), ("feedback", "provide feedback to a document on the content management system"), ("search content", "search the content management system"), and so on. In accordance with the identified action from the list of key-value pairs, remaining parsed text and/or icons may be used for other purposes, such as automatically populating details to perform the identified action.

In some embodiments, and by way of a non-limiting example, a particular automation may be performed with respect to one or more external platforms when a graphical object is moved into an action region (or dragged and dropped into an action region). The particular automation may be configured by a user based on querying an integration registry, which stores data corresponding to one or more different automations (or tasks), which can be performed with respect to one or more external platforms. In accordance with the particular automation configured for the action region, an automation interface (UI) may be displayed to receive additional input to perform the particular automation with respect to the one or more external platforms. The automation interface (UI) may display one or more fields to receive additional input from the user based on a particular external platform and its corresponding platform service such as the content management service 120, the issue tracking service 122, the chat service 124, the authorization service 116, and/or the other services 118, and so on.

In some embodiments, the integration registry may provide a list of available web extensions or plugins that can be executed in conjunction with the whiteboard application service 114. The integration registry may itself be an extension or be included with the whiteboard application service 114. In some implementations, an automation that can be performed by a user of a client device with respect to one or more external platforms may be based on a permission granted to a user of the client device or a user profile of a user of the client device. In some cases, the integration registry may be a service executing on the collaboration platform server 112, and/or an integration registry as a web extension or a plugin executing on a client device that is synchronized with the integration registry on the collaboration platform server 112.

As shown in FIG. 1, the content collaboration system 100 includes a host server 112 (also referred herein as a collaboration platform server 112) of a set of host servers, which may be a host of multiple platform services. The host server 112, which may use one or more virtual or physical computing resources (collectively referred in many cases as a "cloud platform"). In some cases, the set of host servers can be physically collocated or in other cases, each may be positioned in a geographically unique location.

The host server 112 of the set of host servers can be communicably coupled to one or more client devices by a network 110. Multiple example client devices are shown as the client devices 102, and 104. The host server 112 of the set of host servers may include one or more host services and/or other server components or modules to support infrastructure for one or more backend applications, each of which may be associated with a particular software platform, such as a documentation platform or an issue tracking platform. The documentation platform may be a document management system or a content management system, and the issue tracking platform may be an issue management system, and so on. For example, the host server 112 may host a whiteboarding application service 114, an authorization service 116, a content management service 120, an issue tracking service 122, a chat service 124, and other services 118. The host server 112 may also include a logging service 126. The host server 112 may also have a local cache to store an events history corresponding to each whiteboarding session, which may be used to generate and communicate a report describing various actions performed during the whiteboarding session to participant users of the whiteboarding session. Additionally, or alternatively, a local database, a remote database, and/or a cache (for example, in a cloud environment) may be used to store the event history.

Accordingly, the whiteboarding application service 114 may provide an interface to client devices 102, and 104 to the one or more backend applications, and/or software platforms, such as a content management system or an issue tracking platform during collaboration with other users during a whiteboarding session or working individually to perform an automation with respect to one or more external platforms, as described herein. The client devices 102, and 104 may be executing a frontend application that consumes services provided by the whiteboarding application service 114 during the whiteboarding session. By way of a non-limiting example, the interface provided by the whiteboarding application service 114 may be webservice based, such as a REpresentational State Transfer (REST) webservice. The electronic documents, pages, or electronic content may be transferred between a client device and a host server using one or more of JavaScript Graphical object Notation (JSON), Extensible Markup Language (XML), HyperText Markup Language (HTML), and/or a proprietary document format. Additionally, or alternatively, the interface provided by the whiteboarding application service 114 may be as a plugin of a web browser or a web extension of a web browser.

In some embodiments, a user may be admitted to a whiteboarding session, or the user may be permitted to perform an automation with respect to one or more external platforms, based on authentication and/or authorization of a user using the authorization service 116. The authorization service 116 may authenticate a user based on user credentials, which may include a username or other user identification, password or pin, biometric data, or other user-identifying information. The user credentials may be stored and tracked using a token, an authentication cookie, or other similar data element. Upon successful authentication/authorization of a user, the whiteboarding application service 114 may retrieve a user profile associated with an authenticated user of a client device. The user profile associated with the user may suggest various permissions of a user for creating, editing, accessing, searching, and/or viewing various electronic documents, pages, electronic content, issues, tickets on the content management system and/or the issue tracking platform. The user profile associated with the user may also identify other details of the user, including but not limited to, a role of a user in an organization, a role of the user during the whiteboarding session, one or more groups to which a user is a member, other users of the one or more groups to which the user is a member, one or more projects related to the user, one or more issues or tickets (managed by the issue tracking platform) the user is assigned to, and so on. The user profile may include, but not limited to, user permission settings or profiles, and user history that may include user logs or event histories, system settings, administrator profile settings, content space settings, and other system profile data associated with the backend applications described herein and associated with the user. The user profile may also include user permission settings or profiles corresponding to performing an automation with respect to one or more external platforms. Accordingly, the user of the client device may participate and perform various actions including an automation with respect to the issue tracking platform and/or the content management system based on the retrieved user profile. The other services 118 described herein may provide a user interface to other applications or services, for example, an audio and/or a video recording of the whiteboarding session.

While the whiteboarding application service 114 is configured to enable collaboration among participant users on a virtual whiteboard displayed as a virtual whiteboard graphical user interface on a display of each client device, the chat service 124 may provide other services related to a chat interface or a messaging interface during the whiteboarding session. The logging service 126 may log various events, messages, alarms, notifications, and so on, for debugging purposes. The logging service 126 may also log properties of a whiteboarding session including, for example, a start time and an end time of the whiteboarding session, a time when each participant user of the whiteboarding session joined and/or left the whiteboarding session, etc., which may be used to generate and communicate a report describing various actions performed during the whiteboarding session to participant users of the whiteboarding session.

The content management service 120 may be a plug-in, a module, a library, an API, and/or a microservice providing interface to a content management system (not shown) managing content items. Alternatively, the content management service 120 may manage content items for the content collaboration platform 100. Using the interface provided by the content management service 120, one or more content items managed by the content management system may be updated, edited, deleted, viewed, and/or searched as described herein in accordance with the parsed text and/or icons of graphical objects, and/or in accordance with an action configured for an action region, as described herein. A new content item or a template for a new content item may also be created on the content management system using the interface provided by the content management service 120. Thereby, a participant user is not required to launch an instance of the content management system web browser application separately to perform operations with respect to one or more content items managed by the content management system during a whiteboarding session. In some cases, the content management service 120 may be a documentation or wiki service that provides documents or pages of a document space or page space. The pages or documents may include user-generated content used to document projects, products, or services for an organization. In some cases, the pages or documents are implemented as part of an information technology service management (ITSM) system for providing documentation for solving user issues or technical problems.

The issue tracking service 122 may be a plug-in, a module, a library, an API, and/or a microservice providing an interface to an issue tracking platform (not shown) managing issues or tickets. Using the interface provided by the issue tracking service 122, one or more issues managed by the issue tracking platform may be updated, edited, deleted, viewed, and/or searched as described herein in accordance with the parsed text and/or icons of graphical objects, and/or in accordance with an action configured for an action region, as described herein. A new issue or a template for a new issue may also be created on the issue tracking platform using the interface provided by the issue tracking service 122. Thereby, a participant user is not required to launch an instance of the issue tracking platform web browser application separately to perform operations with respect to one or more issues managed by the issue tracking platform during a whiteboarding session. By way of a non-limiting example, any service described herein may be a plug-in, a module, a library, an API, and/or a microservice providing a respective interface. The issue tracking service 122 may also be operated as part of an ITSM system used to track tickets or technical issues raised by users or clients.

FIGS. 2A-2E depict example views of a virtual whiteboard graphical user interface or a frontend application executing on a client device of a user. As described herein, views 200a-200c shown in FIGS. 2A-2E are views of a virtual whiteboard graphical user interface, which is, for example, a virtual whiteboard, shown on a display of a client device of each participant user of a whiteboarding session. FIGS. 2A-2E describe example views of a virtual whiteboard graphical user interface, which is using services provided by the issue tracking service and the whiteboarding application service along with other services such as an authorization service 116, a chat service 124, a logging service 126, and other services 118.

Using the conferencing platform 128, a whiteboarding session may be scheduled with a number of users as participants of a whiteboarding session. During the whiteboarding session, participant users may be admitted to the whiteboarding session based on their authentication using the authorization service 116. Once a participant user is admitted to the whiteboarding session, a virtual whiteboard graphical user interface 200a may be displayed on a display of a client device of the participant user. The virtual whiteboard graphical user interface 200a may include a virtual canvas 238.

A host user of the whiteboarding session or a participant user of the whiteboarding session may designate one or more action regions 202, 204 within the virtual canvas 238 by selecting an appropriate automation primitive or other user interface tool. A shape, a size, and/or a location (or coordinates) of the one or more action regions 202, 204 on the virtual whiteboard graphical user interface may be configured by the host user or the participant user. The shape, the size, and/or the location (or coordinates) are thus properties of the action regions 202, 204. In some embodiments, each action region of action regions 202, 204 may be created and configured to serve a different purpose and/or to perform a particular action, as described below. In one example, the actions regions 202, 204 within the virtual canvas 238 on the virtual whiteboard graphical user interface may thus be configured to perform one or more actions with respect to an issue tracking platform, which is distinct from the content collaboration platform.

Each participant user, depending on their role during the whiteboarding session, may create a set of graphical objects including one or more graphical objects displayed in a view 200*a* as 206, 208, 210, and/or 212. Since the graphical objects 206, 208, 210, and/or 212 are created by a participant user of the whiteboarding session, the graphical objects 206, 208, 210, and/or 212 may be referred herein as user-defined graphical objects. The user-defined graphical objects may be configurable and may be defined in accordance with an existing primitive object available on toolbar panel 214 or able to be selected using another user-interface selection object. A shape, a size, and/or a color of a graphical object may be configurable by the host user or the participant user. For example, a graphical object created by or created for a participant user User-A may have a background of red color, and a graphical object created by or created for a participant user User-B may have a background of blue color. A color of text, and/or a font of text may also be configurable for each participant user and/or for each graphical object by the host user or the participant user. Accordingly, the shape of the graphical object, the size of the graphical object, the background color of the graphical object, text displayed corresponding to the graphical object, the font of the text displayed corresponding to the graphical object, the color of the text displayed corresponding to the graphical object may be properties of the graphical object. Accordingly, a set of graphical objects (or a set of user-defined graphical objects) including one or more graphical objects may be generated based on input from participant users of the whiteboarding session. The set of graphical objects upon generation may be placed in the virtual canvas 238 excluding the actions regions 202, 204.

Each user-defined graphical object of the set of user-defined graphical objects may include text, images, or other user-generated content. In some cases, the user-defined graphical object may thus be a virtual note object including user-generated content such as text. In some embodiments, the user-generated content may be extracted and analyzed. For example, the text of a respective user-defined graphical object may be parsed using a natural language processing technique, and/or a machine-learning algorithm. Based on the parsed text, various keywords may be identified. Using the identified keywords, it may be determined that a graphical object (or a virtual note object) corresponds to or is related to an issue managed by an issue tracking platform, and a particular action is performed on the issue tracking platform when the graphical object (or the virtual note object) is moved or dragged into an action region. Additionally, or alternatively, the keywords may also identify one or more of: a description of an issue managed by the issue tracking platform, a title of the issue, an assignee of the issue, a project name associated with the issue, a severity of the issue, and so on. The assignee of the issue may be a name or a user-id of a user to whom the issue is assigned.

An example graphical object 206, 208, 210, or 210 generated by a participant user User-A with a background color of red may be as shown below:

TABLE 1

| An Example Graphical object |
| --- |
| New Issue |
| Desktop Team |
| Battery Not Charging Critical |
| John |

Based on parsing of text corresponding to the graphical object shown above, various keywords may be identified as "New Issue," "Desktop," "Desktop Team," "Battery Not Charging," "John," and "Critical." Using a machine-learning algorithm, a keyword "New Issue" may be identified as a particular action to be performed on the issue tracking platform, a keyword "Desktop" may be identified as a project name, a keyword "Desktop Team" may be identified as a group or a team to which a new issue is to be assigned. Similarly, a keyword "Battery Not Charging" may be identified as a title of the new issue and/or as a description of the new issue, and "Critical" may be determined to be a severity of the new issue to be created. The parsed text "John" may be identified as an assignee of the issue. Various keywords identified based on parsing of the text included in the user-defined graphical object may thus correspond with various attributes of an issue being managed by the issue tracking platform. The background color of the graphical object may be used to identify a reporter of the new issue, for example, User-A, in this case. However, the background color of the graphical object may be used to identify other properties associated with the new issue as well.

A participant user may generate a number of graphical objects, and the generated graphical objects may be placed and/or displayed in the virtual canvas 238 on the virtual whiteboard graphical user interface in an area other than action regions 202, 204. A toolbar panel 214 may be displayed on the virtual whiteboard graphical user interface, for example, in a bottom area of the virtual canvas 238 of the virtual whiteboard graphical user interface 200*a*. The toolbar panel 214 may display options, for examples, corresponding to create a new folder, update font properties, insert a link, insert an image, etc., in a graphical object. As described previously, the toolbar panel 214 may include selectable options for creating various primitives including an automation or action primitive, a shape primitive, a note primitive, a text primitive, a connector primitive, and other primitives or whiteboard objects.

As shown in a view 200*b*, a participant user of a whiteboarding session may move or positioned a graphical object, for example, the graphical object 210, which may be as shown in Table 1 above, by dragging 216 the graphical object 210 to the action region 202, which may be as shown as 218. Additionally, or alternatively, the participant user may move the graphical object 210 by updating location (or coordinates) properties of the graphical object to move the graphical object into the action region 202 as the graphical object 218.

When the graphical object 210 is moved into the action region 202 as the graphical object 218, a set of operations may be automatically performed. For example, text corresponding to the graphical object may be parsed and various keywords may be identified, as described above. Since the graphical object 218 includes a keyword "New Issue," an action corresponding to the graphical object 218 is interpreted as opening a new issue on an issue tracking platform. Further, other keywords may be identified corresponding to a project to which the new issue pertains, a reporter of the new issue, a severity of the new issue, and a user to whom the new issue is to be assigned. In some cases, when a graphical object is moved into an action region, a particular action to be performed on the issue tracking platform may be identified.

The whiteboarding application service 114 may communicate with the issue tracking service 122, and automatically pass data corresponding to the action to be performed on the issue tracking platform, and other relevant information such as the title of the issue, the description of the issue, the project name of the issue, the assignee of the issue, the reporter of the issue, and/or the severity of the issue, etc. The issue tracking service 122 may make an API call to the issue tracking platform and based on the response from the issue tracking platform, the issue tracking service 122 using the whiteboarding application service 114 may cause a dialog box 220 to be displayed on the display of the client device in the virtual whiteboard graphical user interface. The dialog box 220 may be displayed as an overlay or a pop-up window over the virtual whiteboard graphical user interface, for example, the view 200*b*. Additionally, or alternatively, the dialog box may be displayed in a new tab of the virtual whiteboard graphical user interface. The virtual whiteboard graphical user interface may support more than one tabs, and each tab may correspond to a different virtual canvas, or a dialog box as discussed above.

The dialog box 220 may include various fields, for example, a project field 222, a reporter field 224, a severity field 226, and/or an assigned to field 228, and so on. The project field 222 may be configured to receive user input as a text input or a user selection from a list of projects for a project to which the new issue is related to. The reporter field 224 may be configured to receive user input as a text input or a user selection from a list of users for a reporter of the new issue. The severity field 226 may be configured to receive user input as a text input or a user selection from a list of severities for a severity of the new issues, and the assigned to field 228 may be configured to receive user input as a text input or a user selection from a list of users to which the new issue is to be assigned. Various fields displayed in the dialog box 220 are for example only, and a more or a less number of fields may be displayed in the dialog box 220. Accordingly, the dialog box 220 may thus be an interface window displaying various user-editable fields for the user to provide input or selection. Additionally, or alternatively, the interface window may display content extracted from parsing text of the graphical object and/or an action to be performed on the issue tracking platform as a preview. The user-editable fields may include, but not limited to, an issue identifier, an assignee of the issue, a reporter of the issue, an issue task, a severity of the issue, a project associated with the issue, a description of the issue, and so on.

The list of projects for the project field, the list of users for the reporter field, the list of users for the assigned to (or assignee) field, and/or the list of severities may be automatically populated based on various criteria, including but not limited to, query results of one or more structured queries performed on the issue tracking platform using keywords identified by parsing the text of the graphical object moved into an action region, a role of the participant user, a number of projects the participant user is currently working or associated with, and/or users in a particular team associated with the project, etc. The list of projects for the project field, the list of users for the reporter field, the list of users for the assignee field, and/or the list of severities may present to the participant user a list of different values to select from, and based on the user selection and/or the user input in text form to various fields of the dialog box, a user may select the submit button 230 to provide a confirmation for creating the new issue based on the user input or user selection provided in the dialog box 220.

In accordance with the user selecting the submit button 230 as a confirmation input, the whiteboarding application service 114 may communicate with the issue tracking service 122, and pass data corresponding to the received user input and/or user selection for the fields shown in the dialog box 220, along with other related data. The issue tracking service 122 may generate an API command to the issue tracking platform. The API command generated by the issue tracking service 122 may include at least a portion of content extracted from the graphical object (or virtual note object) as described above, and an action to be performed on the issue tracking platform. Based on a response to the API command as received from the issue tracking platform, the issue tracking service 122 using the whiteboarding application service 114 may cause display of a confirmation dialog box 232 on the display of the client device in the virtual whiteboard graphical user interface. The confirmation dialog box 232 may be displayed as an overlay or a pop-up window over the virtual whiteboard graphical user interface, for example, the view 200*c*. Additionally, or alternatively, the confirmation dialog box 232 may be displayed, and the dialog box 220 may be removed from the display. The confirmation dialog box 232 may display a status corresponding to performed action, for example, creating a new issue on the issue tracking platform in this case. So, if a new issue is successfully created, the status may display an ID of a new issue created on the issue tracking platform. In case there is a failure in creating the new issue, an error message and/or an error message code may be displayed in the confirmation dialog box 232.

Figure 2A:
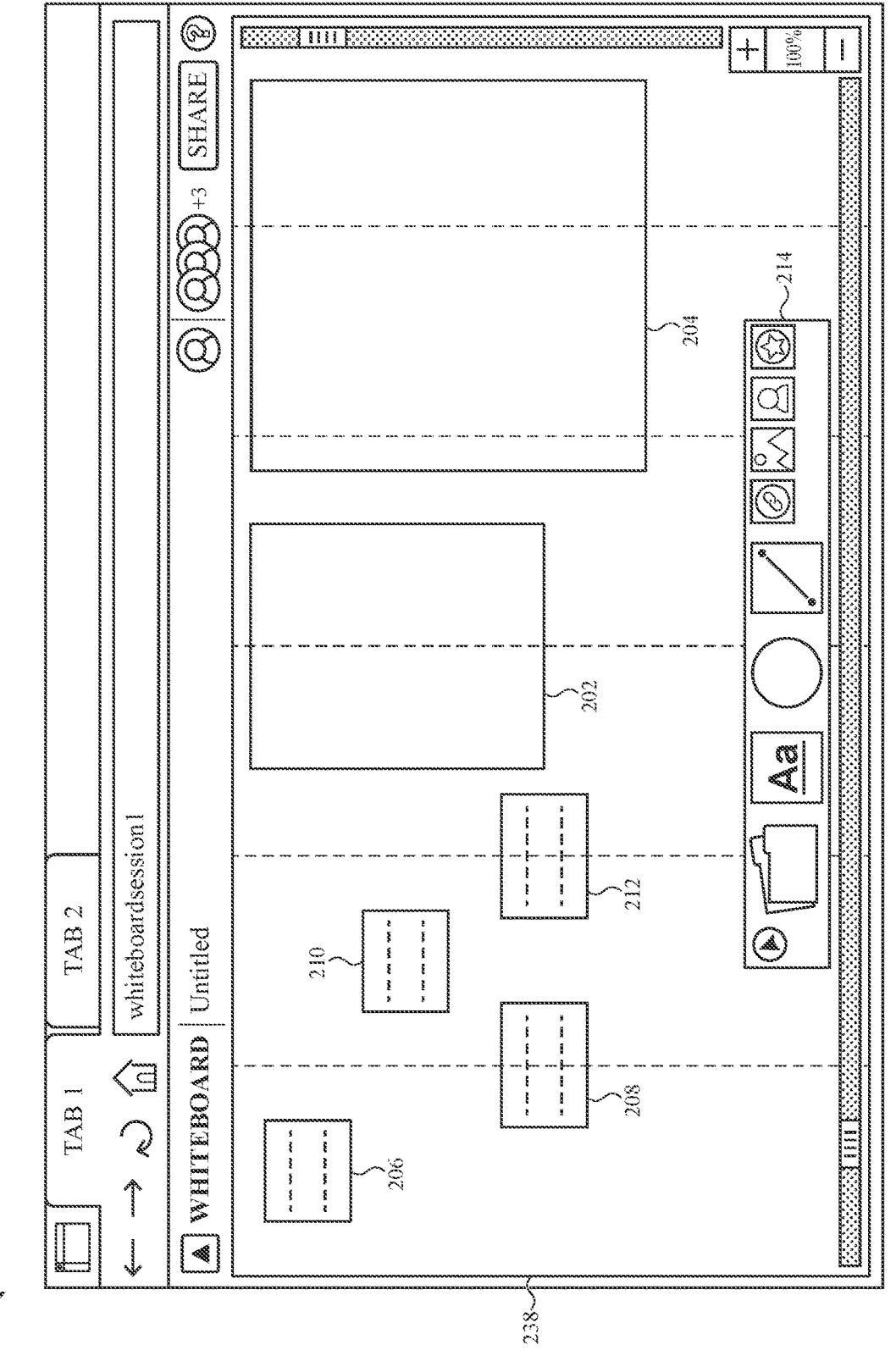
FIGS. 2A-2E depict example views of a virtual whiteboard graphical collaboration interface, in accordance with some embodiments.
Figure 2B:
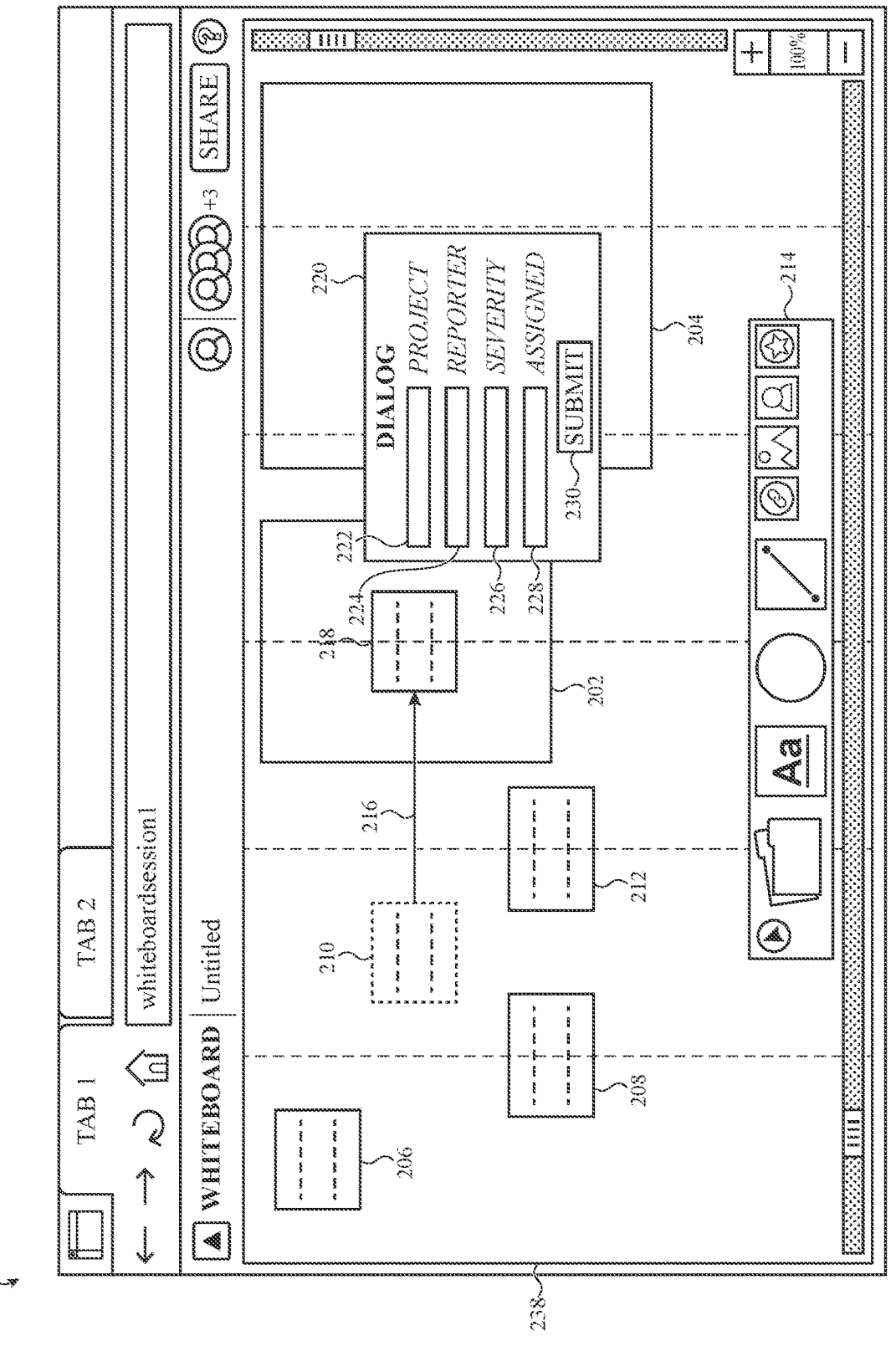
Figure 2C:
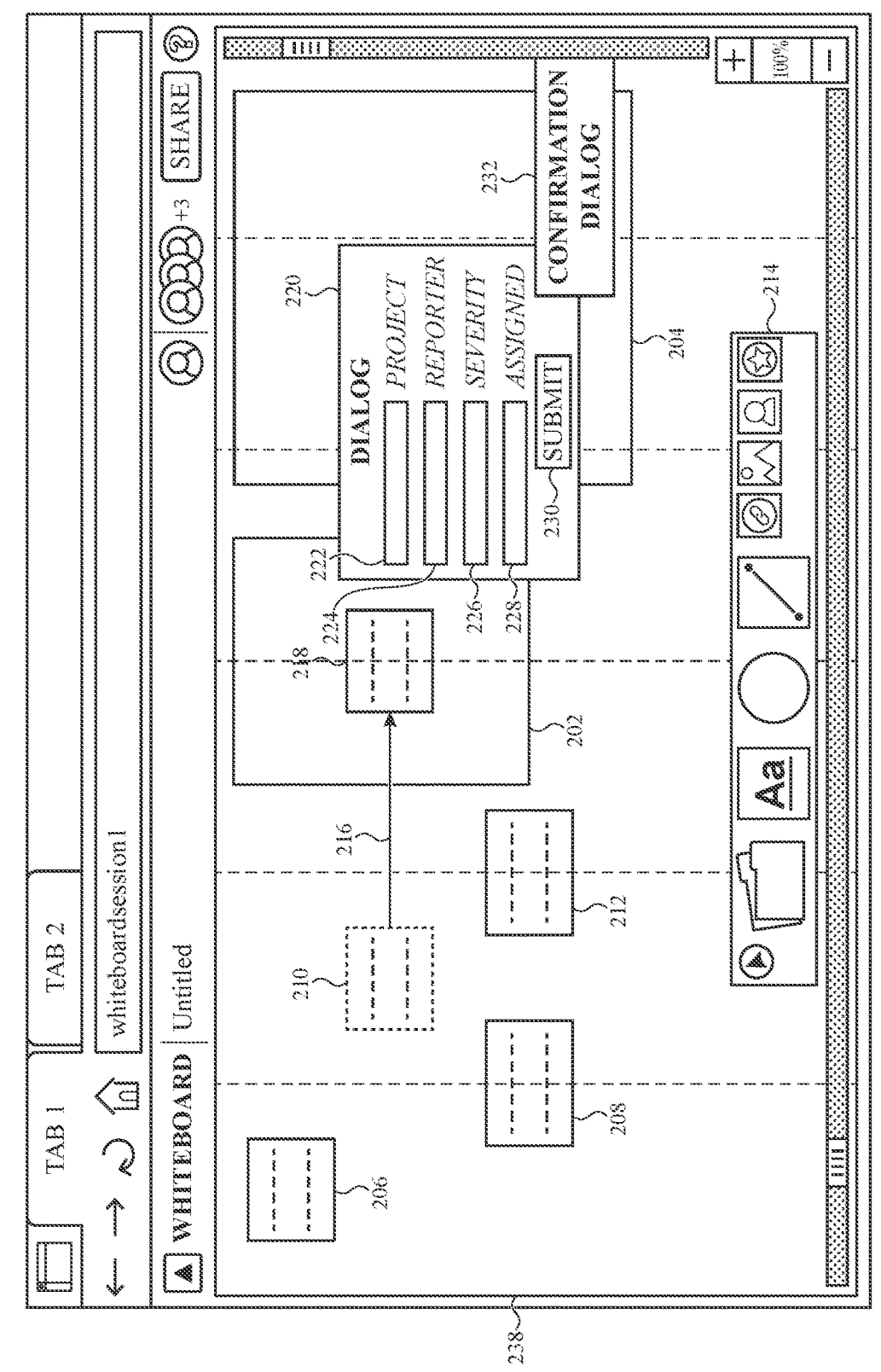
Figure 2D:
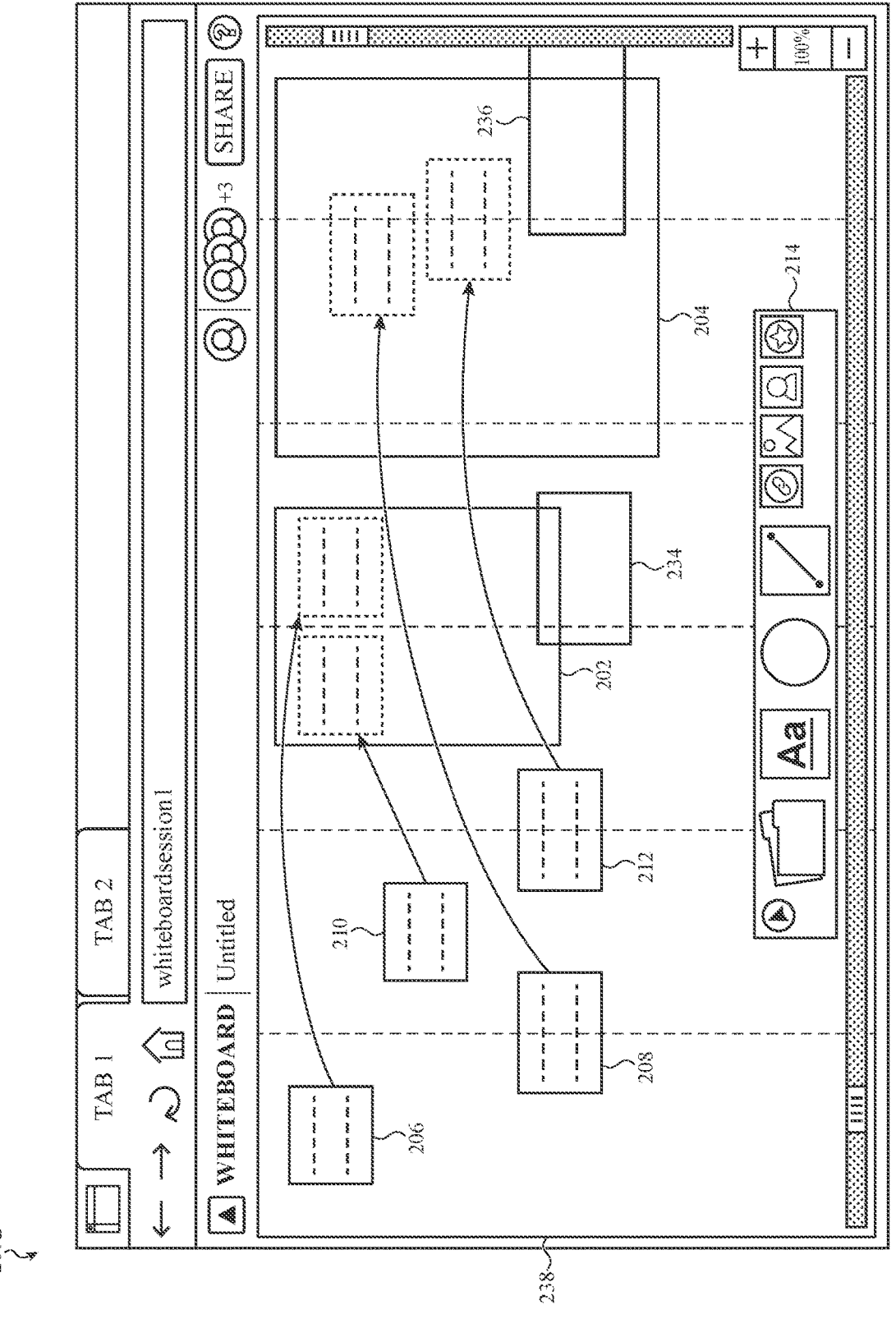

A view 200*d* of a virtual whiteboard graphical user interface shown in FIG. 2D describes another aspect of the virtual whiteboard graphical user interface. The action regions 202 and 204 each may be configured by a participant user or a host user of a whiteboarding session to perform a specific action when a graphical object is moved into the action region 202 or 204. Additionally, or alternatively, an action to be performed when a graphical object into the action region 202 and/or the action region 204 may be pre-configured and may not be updated by the participant user or the host user of the whiteboarding session.

For example, the action region 202 may be configured to create a new issue based on keywords identified from parsing text of a graphical object moved into the action region 202, and the action region 204 may be configured to perform an issue modification on the issue tracking platform. The issue modification may be performed for an issue that is identified by performing a structured query using keywords identified by parsing text of a graphical object moved into the action region 204. By way of a non-limiting example, the issue modification may be setting a status of an issue to a closed/resolved state. Actions described herein as configured for one or more action regions are for example only, and an action region may be configured to perform any other action on the issue tracking platform.

Further, as shown in the view 200*d*, a number of graphical objects may be moved together into an action region to perform a batch action corresponding to the moved graphical objects. The batch action may be performed using one or more API commands including content extracted from graphical objects moved into the action region. Accordingly, when graphical objects 206 and 210 are moved into the action region 202, two new issues based on keywords identified corresponding to the graphical objects 206 and 210 may be automatically created as described above, and a confirmation dialog box 234 may be displayed according to a status of the performed batch action of creating new issues. One or more dialog boxes (similar to the previous example) may also be displayed prior to performing the batch action to receive a user input or a user selection to perform the batch action.

Similarly, when graphical objects 208 and 212 are moved into the action region 204, issues managed by the issue tracking platform may be identified by generating a structured query using keywords identified by parsing text of a graphical object moved into the action region 204. The generated structured query may be then performed on a datastore of the issue tracking platform to identify one or more issues or one or more issue objects managed by the issue tracking platform corresponding to the structured query. The identified issues or issue objects corresponding to text included in the graphical objects 208 and 212 may be automatically updated to change their state to a closed/resolved state, and a confirmation dialog box 236 may be displayed according to a status of the performed batch action of updating status of issues to a closed state.

Figure 2E:
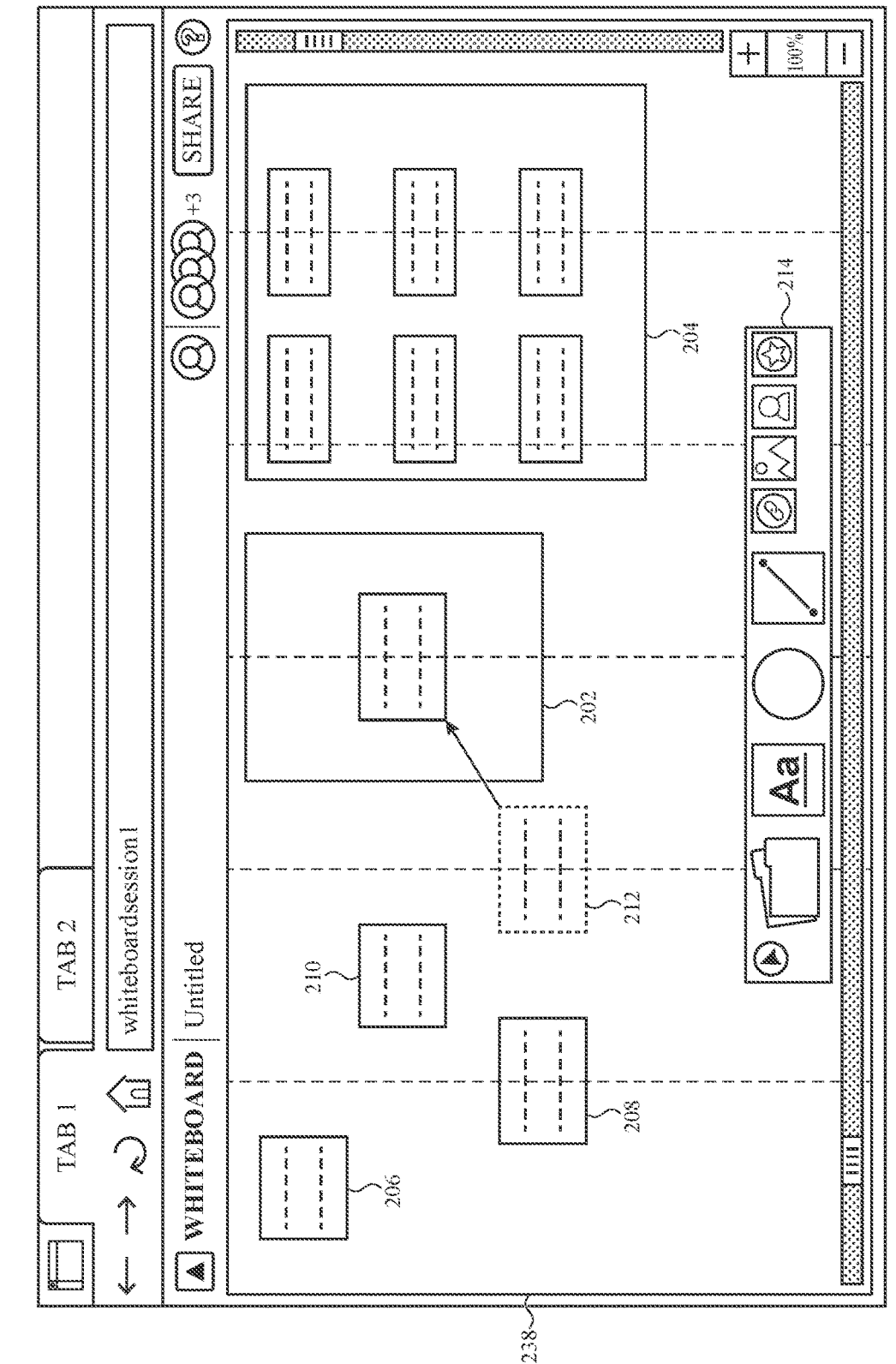

A view 200e of a virtual whiteboard graphical user interface shown in FIG. 2E describes another aspect of the virtual whiteboard graphical user interface. Each of the action regions 202 and 204 may be configured to perform a specific action when a graphical object is moved into the action region 202 or 204. For example, the action region 202 may be configured to perform a specific action, for example, searching an issue tracking platform using one or more keywords identified from parsing text of a graphical object moved into the action region 202 as search criteria. The action region 204 may be configured to display search results from the issue tracking platform in accordance with a search performed on the issue tracking platform by moving a graphical object into the action region 202.

As shown in the view 200e, when a graphical object 212 is moved into the action region 202, a search operation may be performed on the issue tracking platform in accordance with one or more identified keywords as search criteria using the whiteboarding application service 114 and the issue tracking service 122, as described herein. In accordance with the returned search result from the issue tracking platform, a number of graphical objects corresponding to the search result may be displayed in the action region 204. Additionally, or alternatively, a number of graphical objects corresponding to search result may be displayed in an interface window as an overlay or a pop-up window over the virtual whiteboard graphical user interface 200e.

Each graphical object displayed in the action region 204 (or the interface window over the virtual whiteboard graphical user interface) may include a link to an issue managed by the issue tracking platform. Additionally, or alternatively, when a user hovers a mouse or control over a specific area of a graphical object in the action region 204, key fields of the issue corresponding to the graphical object may be displayed as an overlay or a pop-up window on the virtual whiteboard graphical user interface of 200e, and the overlay or the pop-up window is removed from displaying when the mouse or control is moved away from the specific area of the graphical object in the action region 204.

Further each issue in the search result may be ranked and displayed in an order according to their relevancy rank. The relevancy rank may be determined by the issue tracking platform, or by the issue tracking service 122.

The virtual whiteboard graphical user interface shown in FIGS. 2A-2E may be implemented in a web browser client application using HTML, JavaScript, or other web-enabled protocol.

Figure 3A:
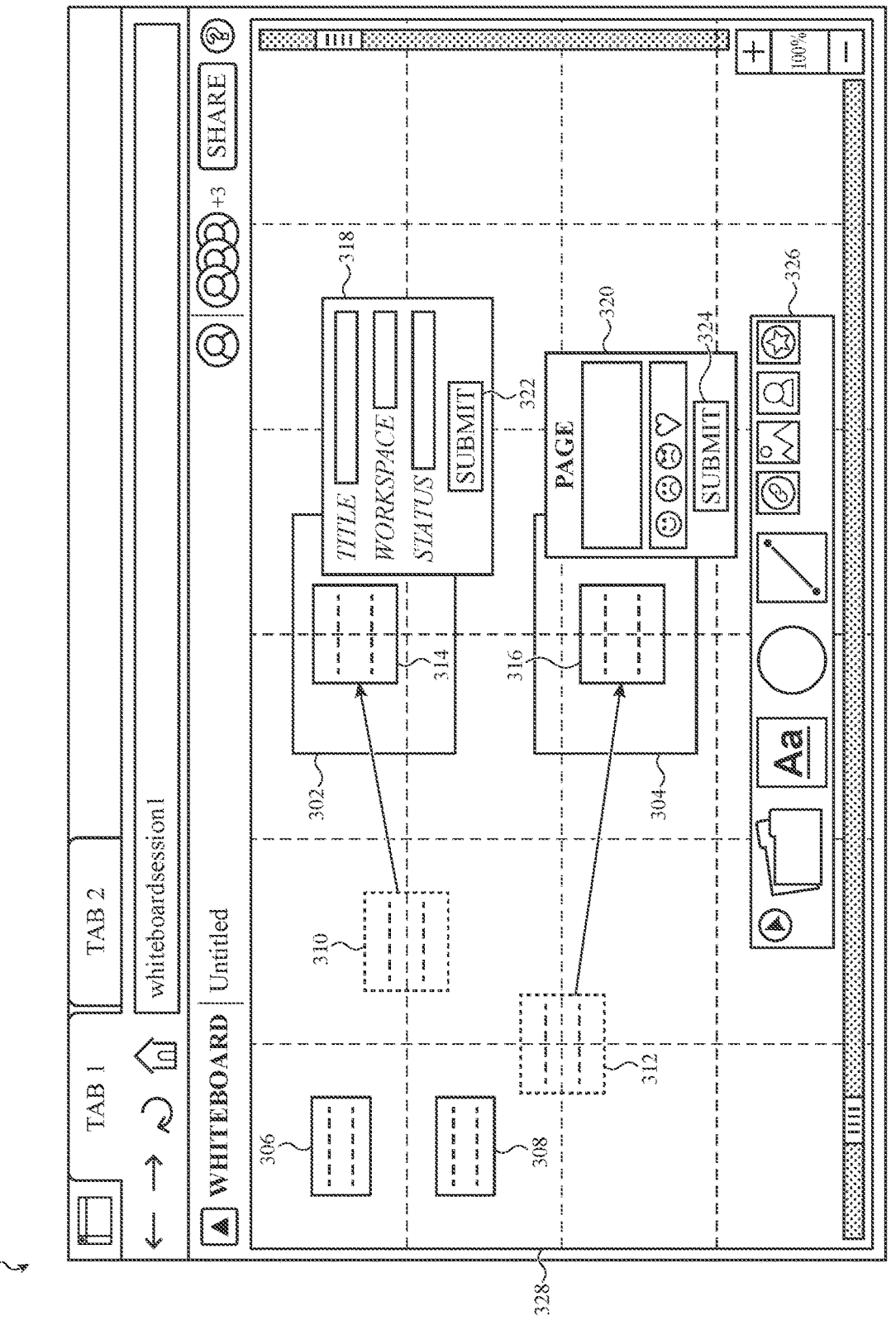
FIGS. 3A-3B depict example views of a virtual whiteboard graphical collaboration interface, in accordance with some embodiments.
Figure 3B:
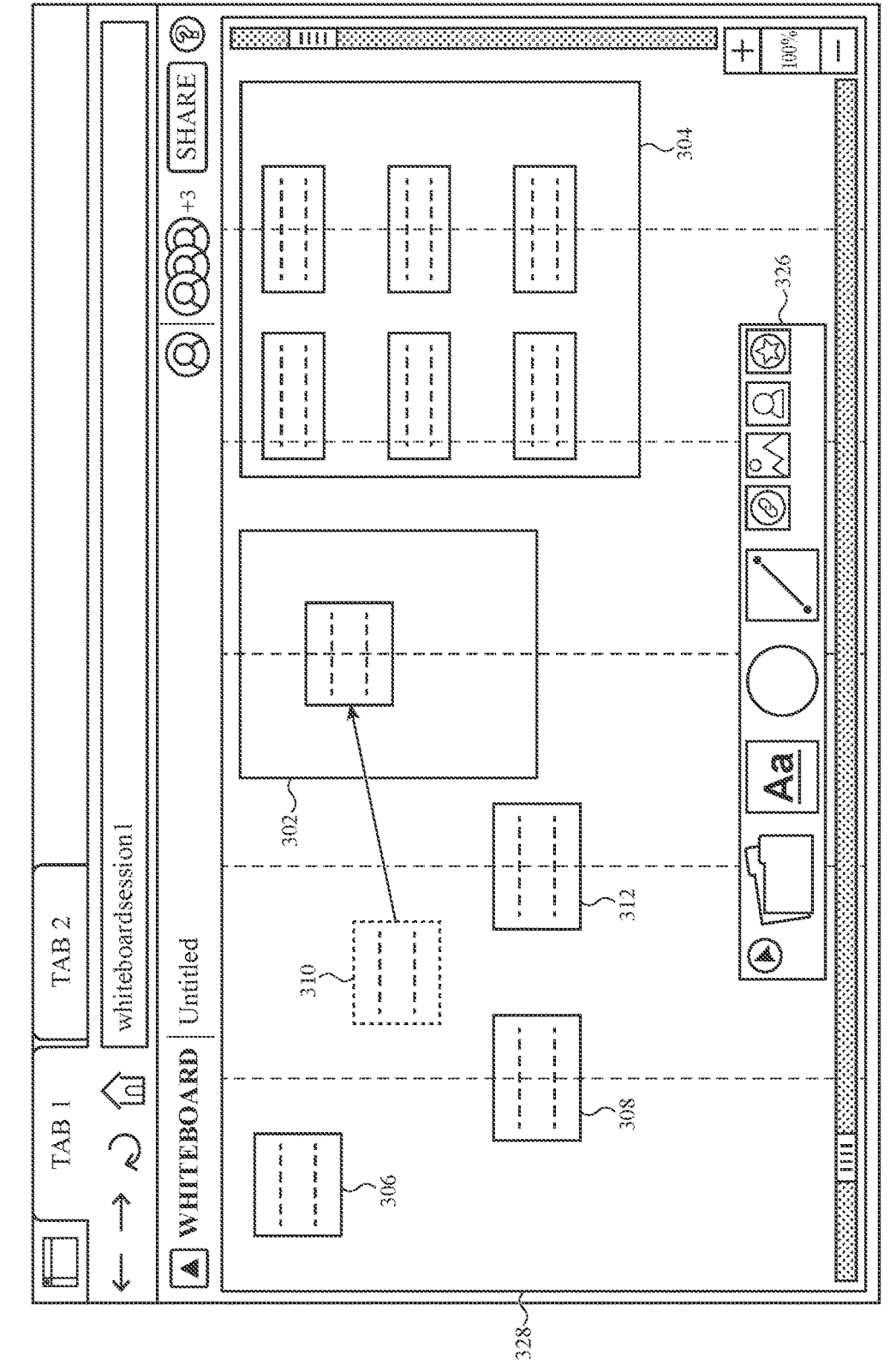

FIGS. 3A-3B depict example views of a virtual whiteboard graphical user interface, in accordance with some embodiments. The virtual whiteboard graphical user interface views 300a and 300b are similar to the virtual whiteboard graphical user interface views 200a-200e; however, graphical objects shown in 300a and 300b correspond with content items managed by a content management service 120 of the content collaboration platform 100. The Examples of graphical objects corresponding to an issue tracking platform and graphical objects corresponding to a content management service is discussed separately using FIGS. 2A-2E and FIGS. 3A-3B for discussion purpose only, and a virtual whiteboard graphical user interface may perform an action with respect to an issue tracking platform and/or a content management service based on the keywords identified from parsing text of a graphical object moved into an action region. Accordingly, embodiments described herein using FIGS. 2A-2E with respect to an issue tracking platform may also be applicable to embodiments described herein using FIGS. 3A-3B for a content management service, and vice versa.

A view 300a of a virtual whiteboard graphical user interface shown in FIG. 3A describes an aspect of the virtual whiteboard graphical user interface similar to described above using FIG. 2D with reference to a content management service. The action region 302 and 304, in the virtual canvas 328, each may be configured to perform a specific action when a graphical object, for example, a graphical object 306, 308, 310, or 312, is moved into the action region 302 or 304. For example, the action region 302 may be configured to create a page or a content item based on keywords identified from parsing text corresponding to one or more graphical objects moved into the action region 302, and the action region 304 may be configured to update a content item with feedback based on keywords identified parsing text corresponding to a graphical object moved into the action region 304. The page or content item may be created having a page layout that is determined based on a relative position of each graphical object in the action region 302.

As shown in the view 300a, when a graphical object 310 is moved into the action region 302 as a graphical object 314, keywords may be identified corresponding to the graphical object 314, as described above. As described above with reference to FIGS. 2A-2E, the whiteboarding application service 114 may in this case communicate with the content management service 120, and communicate data corresponding to the action to be performed and other relevant information as identified from the keywords with the content management service. Since the content management service is managing content on the content collaboration platform 100, and thus is not a distinct application or service, as discussed above for an issue tracking platform, the content management service 120 may not need to make an API call to an external content management system. The content management service 120 using the whiteboarding application service 114 may cause a dialog box 318 being displayed on the display of the client device in the virtual whiteboard graphical user interface 300a. The dialog box 318 may include one or more input boxes or fields to receive user input or user selection corresponding to one or more of: an owner (or an author) of a new content item, a title associated with the new content item, a content workspace for the new content item, a status corresponding to the new content item, and so on. Additionally, or alternatively, the dialog box 318 may display an action to be performed.

The owner of the new content item, the title associated with the new content item, the content workspace for the new content item, the status corresponding to the new content item may be automatically populated in the dialog box 318 based on the identified keywords, and/or a user profile of a participant user. A participant user may edit or update a value corresponding to the one or more input boxes before providing a confirmation input using a submit button 322 to create a new page or content item that will be managed by the content management service.

Further, as shown in the view 300a, when a graphical object 312 is moved into the action region 304 as a graphical object 316, keywords may be identified corresponding to graphical object 316, as described above. Since the action region 304 is configured to update a content item with feedback, the whiteboarding application service 114 may in this case communicate with the content management service 120, and communicate data corresponding to the action to be performed, and other relevant information as identified from the keywords. The content management service 120 may cause a dialog box 320 being displayed on the display of the client device in the virtual whiteboard graphical user interface 300a. The dialog box 320 may display a page that is identified by performing a structured query using the keywords as search criteria, and a comment box to receive user input as text, a list of icons or emojis to select for providing user feedback, and/or a list of statuses to update a status corresponding to the content item. A participant user may provide feedback for the content item in the comment box or selecting an icon or emoji from the list of icons or emojis, and/or a new status value selected from the list of statuses or as a text input, before providing a confirmation input using a submit button 324 to update the content item.

A toolbar panel 326 may be displayed on the virtual whiteboard graphical user interface, for example, in a bottom area of the virtual whiteboard graphical user interface 300a. The toolbar panel 326 may display options, for examples, corresponding to create a new folder, update font properties, insert a link, insert an image, etc., in a graphical object.

A view 300b of a virtual whiteboard graphical user interface shown in FIG. 3B describes an aspect of the virtual whiteboard graphical user interface similar to described above using FIG. 2E with reference to a content management system. The action regions 302 and 304 each may be configured to perform a specific action when a graphical object is moved into the action region 302 or 304. For example, the action region 302 may be configured to perform a specific action, for example, searching for existing pages or content items matching particular search criteria, or perform an action based on keywords identified from parsing text corresponding to a graphical object moved into the action region 302. The action region 304 may be configured to display search results from the content management system in accordance with a search performed on the content management system by moving a graphical object into the action region 302.

As shown in the view 300b, when a graphical object 310 is moved into the action region 302, a search operation may be performed on the content management system in accordance with one or more identified keywords as search criteria using the whiteboarding application service 114 and the content management service 120, as described herein. In accordance with the returned search result, a number of graphical objects corresponding to the search result may be displayed in the action region 304. Accordingly, each graphical object in the action region 304 may include a link to a content item managed by the content management service. Additionally, or alternatively, when a user hovers a mouse or control over a specific area of a graphical object in the action region 304, key fields of the content item corresponding to the graphical object may be displayed as an overlay or a pop-up window on the virtual whiteboard graphical user interface of 300b, and the overlay or the pop-up window is removed from displaying when the mouse or control is moved away from the specific area of the graphical object in the action region 304.

Further, each content item displayed in the search result may be ranked and are displayed in an order according to their relevancy rank. The relevancy rank may be determined by the content management system, or by the content management service 120.

In some embodiments, and by way of a non-limiting example, the action region 302 may be configured to search and identify an existing page or a content item matching particular search criteria and update the identified page using content extracted from the graphical object moved into the action region 302. Alternatively, the action region 302 may be configured to search and identify an existing page or a content item matching particular search criteria and create an action item for the identified existing page or content item based on the content extracted from the graphical object moved into the action region 302. By way of a non-limiting example, the action item may be sending the page or content item to a group of users for review and feedback, etc. Alternatively, the action region 302 may be configured to search and identify an existing page or a content item matching particular search criteria and update a decision for the identified existing page or content item based on the content extracted from the graphical object moved into the action region 302. By way of a non-limiting example, the decision may be approving the page for publication or to make the page available to all users in accordance with one or more access policies.

FIGS. 4A-4G depict example views of a whiteboarding application interface instance, in accordance with some embodiments. In particular, example views of a whiteboarding application interface instance correspond with performing an automation with respect to one or more external platforms. The external platforms, as described herein, may include but not limited to an issue management system, issue tracking platform, a document management system, a content management system, and so on. The automation may also be performed locally for the client device on which a whiteboarding application instance is launched and executed by a user of the client device. Each client device executing a whiteboarding application interface instance may be communicatively and/or operably coupled with a whiteboarding service platform (e.g., a collaboration platform server executing a whiteboarding application service 114), which is a whiteboarding backend (e.g., a whiteboarding backend system or a whiteboarding backend platform).

In some embodiments, upon execution of the whiteboarding application instance on the client device, a graphical user interface view 400a of the whiteboarding application instance may be displayed including include a multi-user editable region or virtual canvas 418, which may be configured to receive one or more object creation commands from one or more client devices of one or more users participating in a whiteboarding session or performing automation with respect to the one or more external platforms. Since the virtual canvas 418 may enable collaboration among participating users of the whiteboarding session, the virtual canvas 418 may also be references as a multi-user collaboration region, as described herein.

In some embodiments, a user of a client device or a participating user of a whiteboarding session may provide input that the user wants to create an automation region by selecting an automation option 416 of a toolbar panel 414, which allows the creation of an automation primitive. The toolbar panel 414 is otherwise similar to the toolbar panel 214 described herein except the automation option 416 is expressly shown here. Any of the previous example toolbar panels may also include a corresponding automation option 416 even though not expressly shown in every example user interface. Upon selecting the automation option 416, the user of the client device may provide input such as marking an area of the virtual canvas 418 to create an automation region 402 within the graphical user interface of the whiteboarding application instance, and in particular within the virtual canvas 418. Further, the virtual canvas 418 may be configured to receive user input or object creation commands to create one or more graphical objects shown in FIG. 4A as 404, 406, 408. Objects 404 and 408 may correspond to user-generated objects created in response to a selection of a corresponding object primitive or object creation command. The object 408 may be a selectable graphical object that is linked to an external object or a target location. The object 406 may include content that has been extracted from the external object and/or may include embedded content of the external object. Further, a control panel 410 may also be displayed within the virtual canvas 418. The control panel 410 may display various controls or text formatting options in addition to an option 412 to configure a particular automation for the created automation region 402.

A shape, a size, and/or a location (or coordinates) of the automation region 402 may be configured by the user of the client device. The shape, the size, and/or the location (or coordinates) are thus properties of the automation region 402. In some embodiments, more than one automation region may be created and configured to serve a particular automation, as described below. Accordingly, the user of the client device may assign a unique name to each automation region, which may be assigned by the user of the client device in a user-editable field 420. Further, each automation region may be activated or deactivated by changing a value of a user-editable field 422, and a particular configured automation for the automation region may be performed by the user of the client device by clicking at a user-selectable field 424.

A user of the client device may create the one or more graphical objects 404, 406, 408, which may also be referred herein as user-defined graphical objects. The user-defined graphical objects may be configurable. In some cases, a shape, a size, and/or a (background) color of a graphical object is configurable by the user of the client device. A color of text, and/or a font of text displayed in the graphical object may also be configurable the user of the client device. Accordingly, the shape of the graphical object, the size of the graphical object, the background color of the graphical object, text displayed corresponding to the graphical object, the font of the text displayed corresponding to the graphical object, the color of the text displayed corresponding to the graphical object may be properties of the graphical object. Accordingly, a set of graphical objects (or a set of user-defined graphical objects) including the one or more graphical objects 404, 406, 408 may be generated based on input from the user of the client device.

Further, each of the one or more graphical objects 404, 406, 408 may be selectable and movable graphical objects. According, the user of the client device may select, drag, and drop a graphical object in another area of the virtual canvas 418, for example, the automation region 402. A particular configured automation for the automation region 402 may be performed when the user of the client device selects, drags, and drops a graphical object in the automation region 402. The particular automation for the automation region 402 may be configured as shown in a graphical user interface view 400b of the whiteboarding application instance upon selecting the option 412 of the control panel 410.

In some embodiments, as shown in the graphical user interface view 400b, configuring a particular automation for an automation region may include selecting or naming an automation region, selecting a platform from a set of platforms, and selecting a particular automation (or integration) from a set of automations (or integrations) corresponding to the selected platform. The platform may be an external platform, such as an issue management system, a document management system, a content management system, or the client device itself.

In some embodiments, and by way of a non-limiting example, when only one unnamed automation region exists in the virtual canvas 418, then the user of the client device can assign a unique name to the automation region in an automation region name 428 field of an automation interface user interface (UI) 426. However, if more than one unnamed automation regions exist in the virtual canvas 418, then the user of the client device may assign a unique name to each automation region using the user-editable field 420. Accordingly, the automation region name 428 field may be a pull-down menu displaying one or more automation region names for the user of the client device to select or name an automation region for configuring automation. The unnamed automation region may be displayed as a blank text field to receive an automation region name as an input from the user of the client device.

In some embodiments, the automation interface UI 426 may include a platform selection field 430 which lists one or more external platforms described herein. By way of a non-limiting example, the one or more external platforms may be displayed based on authentication of the of the client device and an obtained user profile of the user of the client device. If the user profile is not available, then the user of the client device may be authenticated to obtain the user profile. The user of the client device may be presented an user interface to provide credentials corresponding the whiteboarding application, and upon successful authentication of the user of the client device with respect to the whiteboarding application, the one or more external platforms may be displayed in the platform selection field 430 for the user to select an external platform for which the user of the client device wants to configure a particular automation for the automation region. In response to a successful authentical of a user, the normal operations of the system may resume.

In some embodiments, and by way of a non-limiting example, the automation interface UI 426 may be dynamically updated to display one or more additional fields based on the particular external platform selected by the user in the platform selection field 430. An example of dynamically updating the automation interface UI 426 for displaying one or more additional fields based on the particular external platform selected by the user in the platform selection field 430 may be as described in as shown in a view 400c of FIG. 4C.

As shown in the view 400c, upon selection of the particular external platform in the platform selection field 430, an integration registry 432 may be queried to identify or determine and list available integrations for the selected external platform. Alternatively, a selection of a trigger 434 or an action 436 may be used to generate a query to the integration registry 432 and identify or determine a list of available integrations. In some cases, multiple fields 432, 434, or 436 may be used to generate a query to the integration registry. The integration registry 432 may be a service executing on, or a database at, a server 448 executing an authorization service 450, platform services 452, a content store 456, and/or an application programming interface (API) gateway 454, and so on. By way of a non-limiting example, the server 448 may the collaboration platform server 112 described herein, and accordingly, the authorization service 450 may be similar to the authorization service 116, the platform services 452 may be similar to one or more of the content management service 120, the issue tracking service 122, the log service 126, the chat service 124, and/or the other services 118. The content store 456 may be a database storing contents, and/or objects related to the one or more external platforms.

In some embodiments, as shown in the view 400c, the integration registry 432 may include information corresponding to one or more integrations (e.g., forge extensions or plugins) associated with one or more respective external platforms. For example, integration fields (or integrations) 438a, 438b, and 438c may be available for selection for an issue tracking platform 438, and an integration 440a may be available for selection for a documentation platform 440. The integration 438a may be an issue creation integration, the integration 438b may be an issue status update integration, and the integration 438c may be an issue assignment integration, and the integration 440a may be a document editing integration. The one or more integrations associated with the one or more external platforms may be available to the user of the client device based on a respective authentication status corresponding to the selected external platform in the platform selection field 430. Accordingly, if the user of the client device is not authenticated with respect to the selected external platform, the user of the client device may be authenticated with respect to the selected external platform to identify the one or more integrations available to the user of the client device for selection using the authorization service 450 as described herein.

Upon successful authentication of the user of the client device with respected to the selected external platform, and based on the one or more integrations available to the user of the client device, the automation interface UI 426 may be dynamically updated to display additional fields such as a trigger field 434 and an action field 436. The trigger field 434 may list one or more triggers to cause a particular action selected from a list of actions listed in the action field 436. By way of a non-limiting example, if the selected external platform in the platform selection field 430 is an issue management system, the trigger field 434 may include a list of triggers, including but not limited to, "when dropped in an automation region," "when a graphical object contains a 'particular word'." and so on, and the action field 436 may include a list of actions, including but not limited to, "create a new issue." "assign the issue to 'a particular assignee'." "close the issue," and so on.

Upon selection of a trigger and an action, the automation interface UI 426 may be dynamically updated to display one or more additional fields to receive user input to cause the user specified automation. The one or more user-editable fields may be determined based on the selected platform and/or integration. For example, if the user has selected "when dropped in an automation region" as the trigger and "create a new issue" as the action, one or more additional fields such as a project field 442, an issue type field 444, and/or a summary field 446 may be displayed. The one or more additional fields may be determined based on querying or an API call/execution via the API gateway 454 to the platform services 452.

In some embodiments, and by way of a non-limiting example, content of a graphical object may be parsed and automatically populated for the required one or more additional fields. For example, if the graphical object include text corresponding to a project type and/or an issue type, the project field 442 and/or the issue type field 444 may be automatically populated based on the parsed content of the graphical object.

Accordingly, when the user of the client device selects, drags, and drops the one or more graphical objects 404, 406, and/or 408 into the automation region 402 which is associated with the issue creation integration, a new issue corresponding to each of the graphical object dropped in the automation region 402 may be created at the issue management through the automation when the user selects the user-selectable field 424 and the user-editable field 422 is set to "ON." Alternatively, or additionally, the issue creation integration may perform search the issue management system in accordance with the parsed content of a graphical object to identify whether an issue corresponding to the parsed content exists or not. Upon determining that the issue exists, then the issue may be updated based on the parsed content, otherwise a new issue may be created based on the parsed content. The automation may be performed by formulating and executing an API command/call to a respective external platform.

An automation with respect to an issue management system as described above is for example purpose only and does not limit the scope of the disclosure in any way. Accordingly, in some other examples of automation that may be performed may be to form a group of all graphical objects in the automation region 402, change a text font size or a font type of text in all graphical objects in the automation region 402, and so on.

In some embodiments, as shown in a view 400d, upon successful performance of an automation content displayed on a graphical object dropped in the automation region 402 may be updated to display a selectable graphical object 458. The selectable graphical object, as described herein, may be a selectable graphical object displaying data extracted from an object managed by an external platform and/or embedded content from the external object or link. For example, when a user of the client device selects a selectable graphical object corresponding to an issue created on an issue management system through the automation, as described herein, data corresponding to an object of the created issue on the issue management system may be displayed as an overlay or in a separate tab or window of the web browser. Accordingly, data displayed upon selection of the selectable graphical object is a digested and/or dynamic content corresponding to an object managed by an external platform, and may not be static data. When corresponding data is modified or altered in the external platform (e.g., the issue tracking platform), the respective extracted data or content will be updated next time the selectable graphical object is loaded or refreshed by the whiteboarding application. The selectable graphical object 458 may be created in response to an action or automation associated with the region 402. For example, in response to a user positioning (e.g., dragging) a virtual note object or other native graphical object into the region 402, a new external object may be automatically created or an existing external object (e.g., an issue of an issue tracking system) may be identified and the native graphical object may be replaced with a selectable graphical object 458, which corresponds to the new or existing external object.

In some embodiments, and by way of a non-limiting example, while collaborating with other users in a whiteboarding session, if a participating user is not authorized or authenticated with respect to a particular external platform and/or to a specific project or so, then that user may be displayed content of that graphical object as "not authorized" shown as 460 instead of a selectable graphical object similar to an item 458. Thus, while the location, size, and other attributes of a selectable graphical object may be displayed in the same fashion to every user of a whiteboarding session, the content of the selectable graphical object may be redacted for certain users in accordance with a permissions profile and/or role for an account in the corresponding external platform (or lack of such an account).

In some embodiments, as shown in a view 400e, multiple automation regions may be linked for performing multistage or chained automations with respect to one or more external platforms. Accordingly, a first automation corresponding to a first automation region may be performed with respect to a first external platform, and a second automation corresponding to a second automation region may be performed with respect to the first external platform or a second external platform different from the first external platform.

In some embodiments, and by way of a non-limiting example, upon creating a second automation region 462 and linking with the automation region 402 (the first automation region 402), a user interface 464 may be displayed as an overlay over a link connecting the first and the second automation regions 402 and 462, respectively. The user interface 464 may enable the user to select an external platform, a trigger, and an action corresponding to the second automation. The trigger here may be a successful completion of the first automation, and the action may be specific to the particular platform selected for the second automation region 462.

Accordingly, the second automation may be performed after the first automation is performed. By way of a non-limiting example, the second automation may be performed after a preconfigured delay period after the first automation is performed. After a first successful automation on a graphical object dropped in the first automation region 402, a selectable graphical object 458a may be displayed, and after successful second automation, the selectable graphical object 458a may be automatically moved and displayed in the second automation region 462 as a selectable graphical object 458b. Additionally, or alternatively, the second automation may be performed in response to the graphical object being dragged from the first automation region 402 and dropped into the second automation region 462.

Figure 4A:
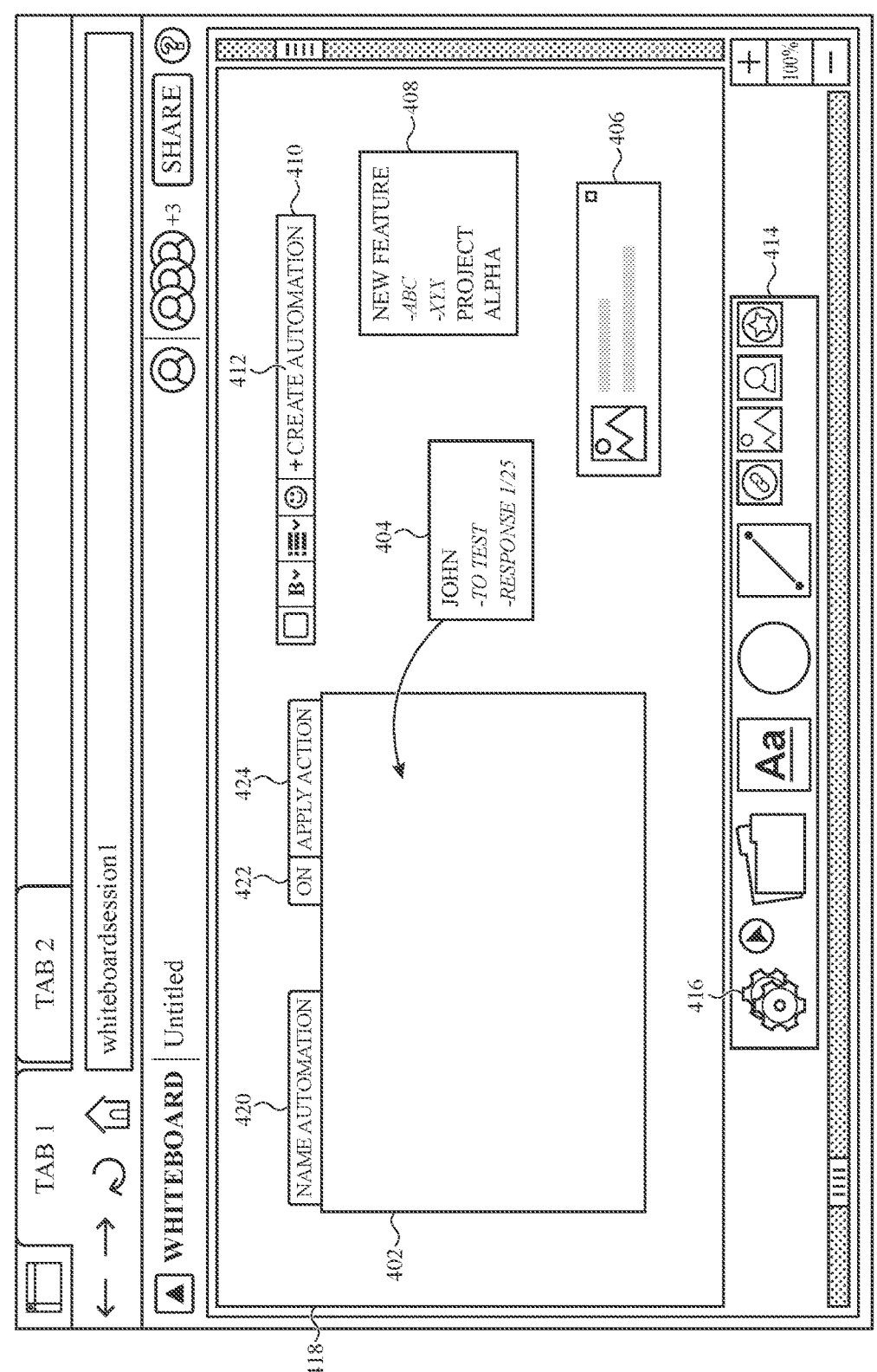
FIGS. 4A-4G depict example views of a whiteboarding application interface instance, in accordance with some embodiments.
Figure 4B:
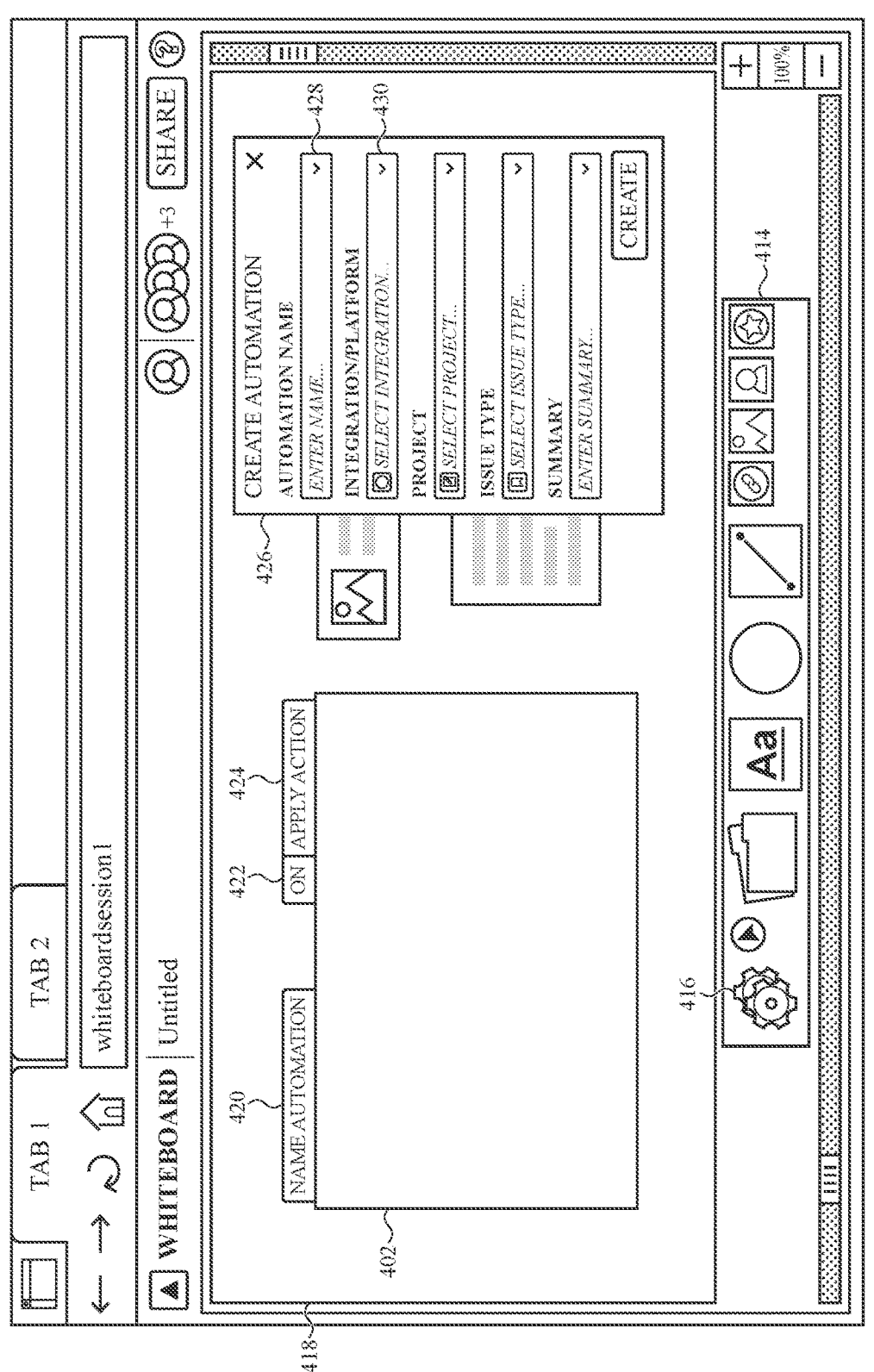
Figure 4C:
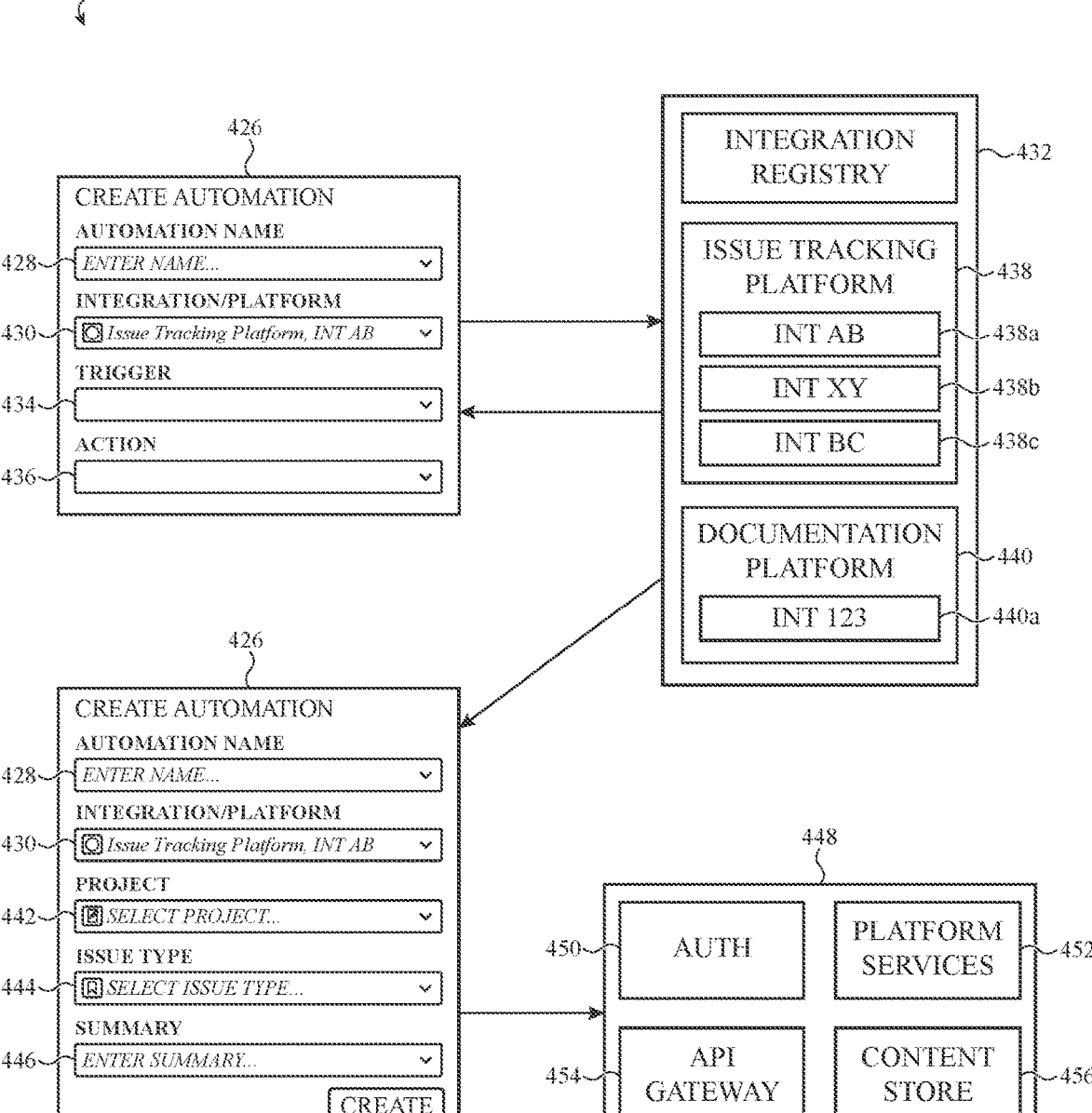
Figure 4D:
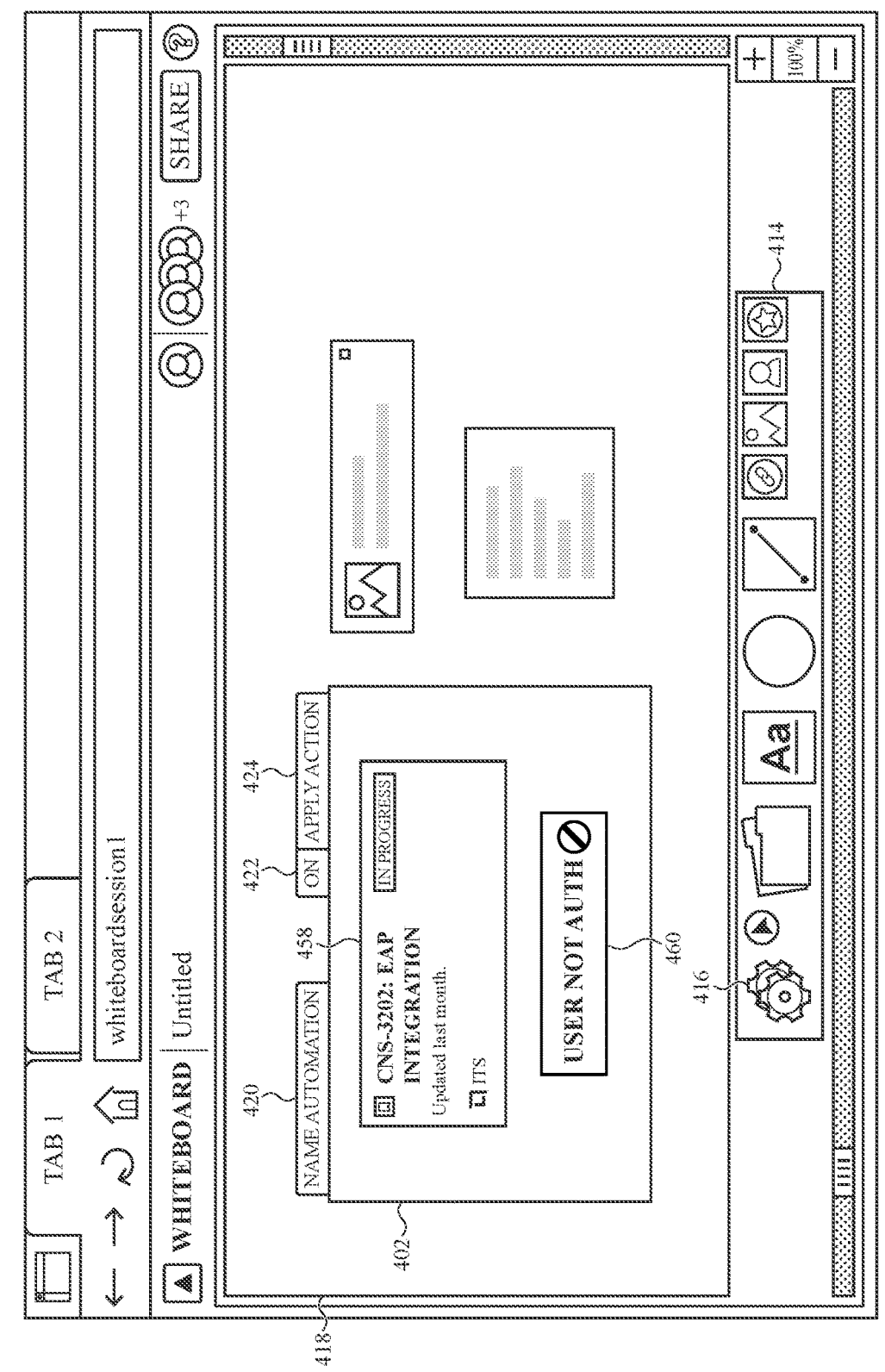
Figure 4E:
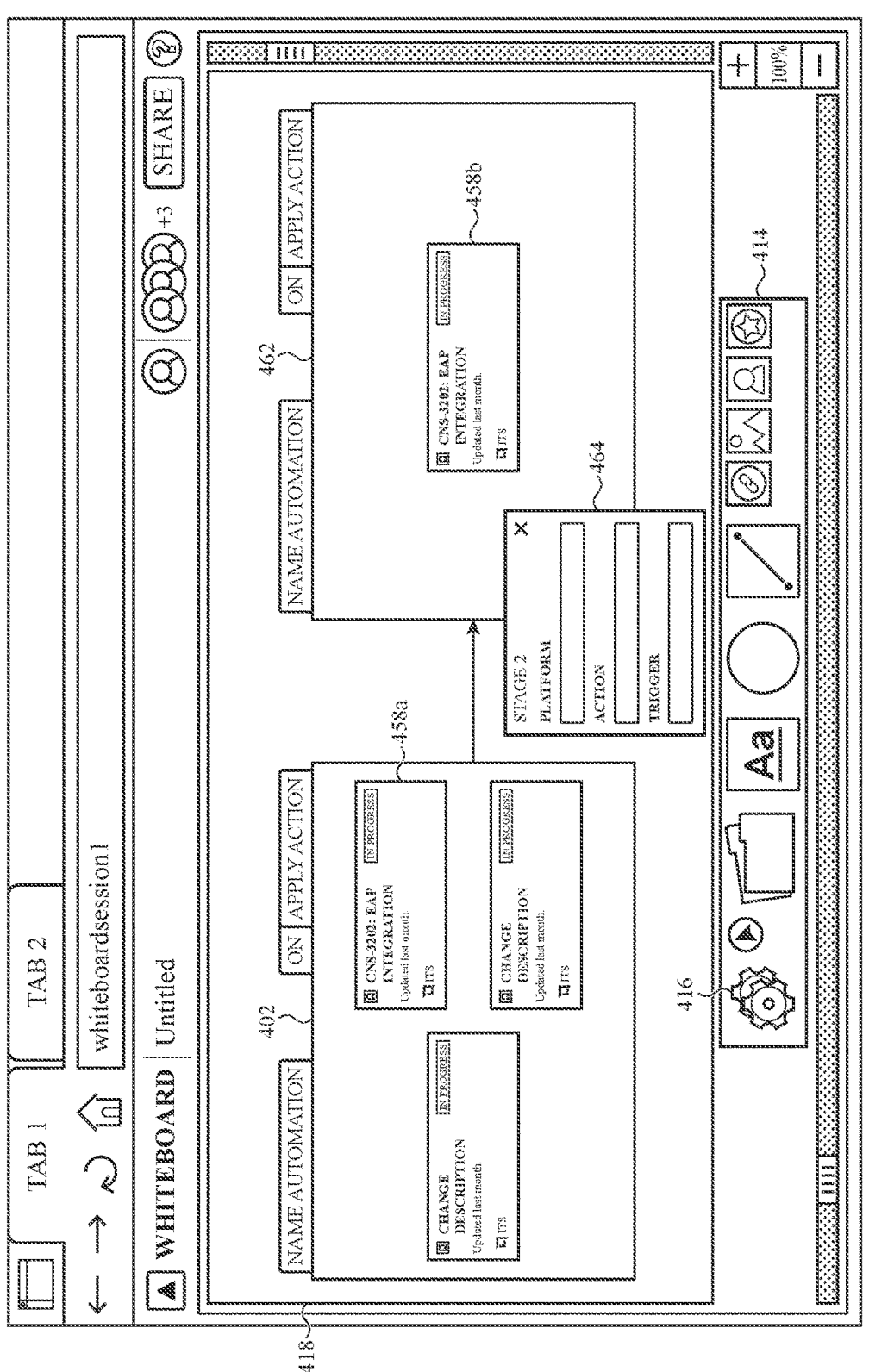
Figure 4F:
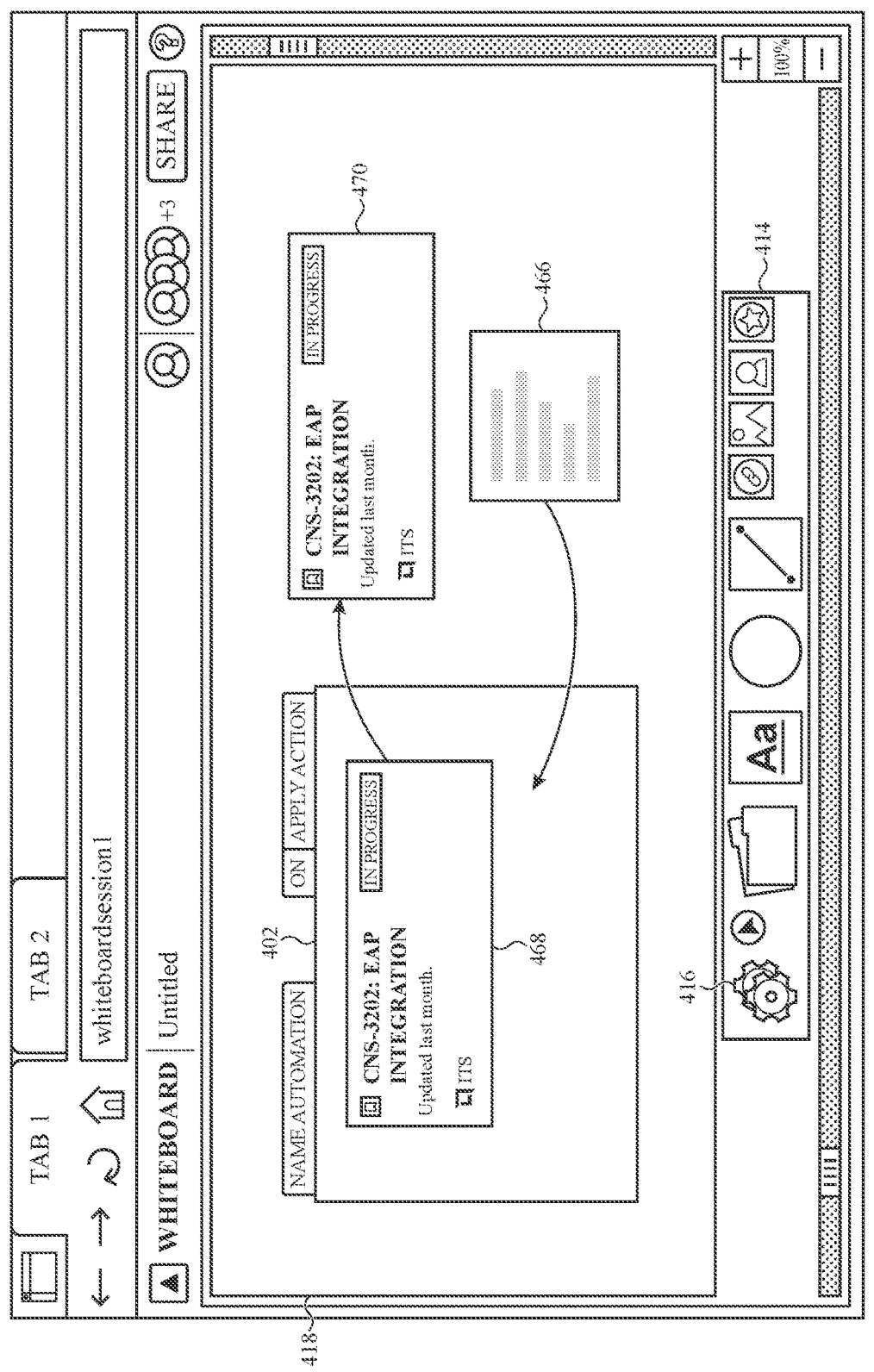

In some embodiments, as shown in a view 400f of FIG. 4F, a user may select, drag, and drop a graphical object 466 in the automation region 402 to perform a corresponding automation. For example, moving the graphical object 466 into the region 402, may cause a new issue to be created or an existing issue to be identified. As a result, the graphical object 466 may be replaced with a corresponding selectable graphical object 468. The selectable graphical object 468 may include content extracted from the external object (e.g., the new or existing issue) and may also be linked to the respective object managed by the external platform. Selection of the selectable graphical object 468 may cause the user interface to be redirected or transitioned to an issue view within a separate issue tracking platform. While an issue and issue tracking platform example is used for purposes of illustration, other external objects of other external platforms may similarly be used to create a selectable graphical object similar to an item 468 of FIG. 4F. As shown in FIG. 4F, when the user moves the graphical object 468 outside the automation region 402, the selectable graphical object 468 (shown as an item 470) remains a selectable graphical object and does not revert to the original native graphical object 466. As discussed previously, because the content is extracted from the external object, the content depicted in the selectable graphical object 470 may be automatically updated to reflect any changes in the external object that may be caused by use of the external system. However, a change to the automation region 402 or future automated actions associated with the region 402 may not be applied to the selectable graphical object 470 when it is positioned external to the region 402.

Figure 4G:
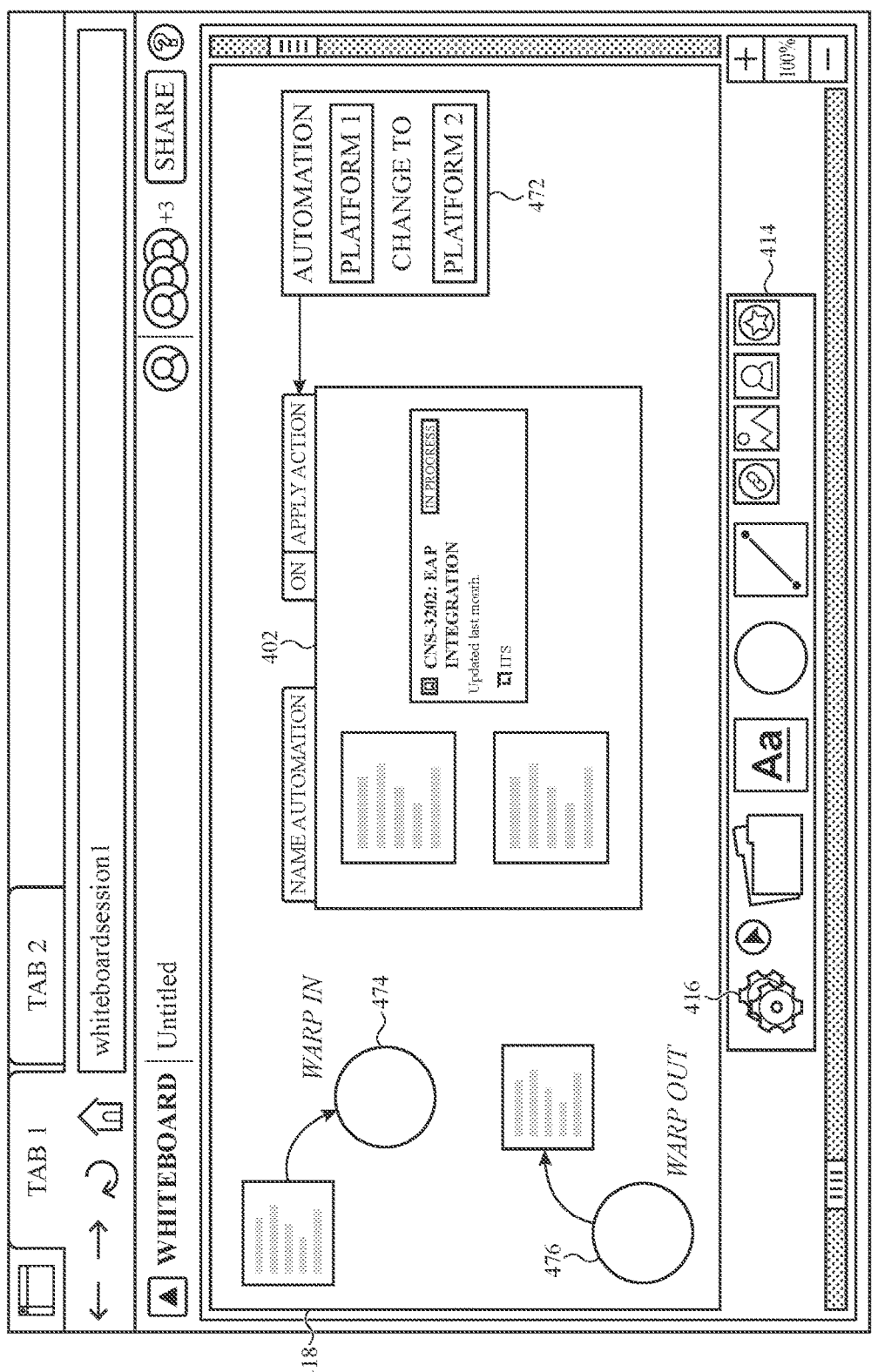

In some embodiments, as shown in a view 400g of FIG. 4G, a user may edit or update the configured automation for the automation region 402 after an automation is performed as described herein. Editing or updating the configured automation for the automation region 402 using an interface 472 as shown may cause a different automation being performed on graphical objects present in the automation region 402, and thereby performing a multi-stage automation without creating multiple automation regions. For objects that are included in the region 402 when the automation is changed or applied, an analysis to determine if each of the objects can be processed with respect to the automation may be performed. In response to objects having a type that is consistent with the selected automation, the automation may automatically be performed. For objects having a type that is not able to be processed by the automation or having a type that is inconsistent with the automation, those objects may not be processed. In some cases, objects that are not processed are visually distinguishable from the objects that are processed. In the present example, one of the objects is replaced with a selectable graphical object having content extracted from an external object while the other two objects (virtual note objects) may have content or a type that is inconsistent with the automation and, thus, remain as unprocessed objects (e.g., remain virtual note objects).

In some embodiments, as shown in the view 400g, the user may create a virtual tunnel having an input end 474 and an output end 476. The output end 476 may be assigned a specific region or a portion of the virtual canvas 418, including a particular automation region, in which a graphical object may appear if a user drags and drops a graphical object at the input end 474. Accordingly, if there are multiple automation regions, the user may create multiple virtual tunnels to effectively drop a graphical object in an automation region. This allows for graphical objects to be easily moved across a large virtual canvas to be shared by different groups of users that may be operating in a different portion of the virtual canvas.

In some embodiments, a user may create a graphical object to include text that when parsed may identify one or more tasks to be performed. Accordingly, while performing an automation, a check may be performed to identify which of the one or more tasks that can be performed through automation, and then the automation may be performed for those identified tasks only. A graphical object and/or each task of a graphical object that cannot be performed through automation may be displayed as visually distinguishable from other graphical objects and/or other tasks.

The graphical user interface shown in FIGS. 4A-4G may be implemented in a web browser client application using HTML, JavaScript, or other web-enabled protocol.

FIG. 5 depicts an example flow chart 500 of a process for collaboration among a group of users using a virtual whiteboard graphical user interface, as described above in accordance with some embodiments. At operation 502, a virtual whiteboard graphical user interface may be displayed on a display of a client of each participant user and/or a host user of a whiteboarding session. The virtual whiteboard graphical user interface may be displayed upon authentication of the participant user of the whiteboarding session and/or the host user of the whiteboarding session using the authorization service 116, as described herein. The virtual whiteboard graphical user interface may include and display a virtual canvas. The virtual canvas, as described herein, may include a set of graphical objects generated based on an input from one or more participant users of the whiteboarding session. Thus, the set of graphical objects may include user-defined graphical objects including user-generated content.

At operation 504, a first user input designating an action region may be received from a participant user or a host user of the whiteboarding session. The action region may be a user-defined action region. In some cases, properties of the action region including a shape, a size, a location of the action region within the virtual canvas, and/or an action to be performed when a graphical object is moved into the action region may be determined and configured by the participant user or the host user of the whiteboarding session. Alternatively, the action region may be a preconfigured action region, and the participant user or the host user of the whiteboarding session may cause the action region to be displayed within the virtual canvas. The participant user or the host user of the whiteboarding session may not be able to update the properties of the preconfigured action region. By way of a non-limiting example, the action region may be associated with an issue tracking platform distinct from the content collaboration platform, or the action region may be associated with a content management system distinct from the content collaboration platform or a content management service of the content collaboration platform.

Operation 506 is relevant in the case where the action region is a user-defined action region. Accordingly, at operation 506, a participant user or a host user of the whiteboarding session may provide a second user input corresponding to properties of the action region designated at operation 504, including but not limited to, an action to be performed when a graphical object is moved into the action region.

At operation 508, a third input may be received from a participant user or a host user of the whiteboarding session. The third input may correspond with the participant user or the host user of the whiteboarding session selecting a graphical object of a plurality of graphical objects positioned and displayed in the virtual canvas to move the selected graphical object into the action region. As described herein, the selected graphical object may be moved into the action region by dragging the selected graphical object from its current location in the virtual canvas into the action region or updating properties of the selected graphical object.

At operation 510, in response to the graphical object being placed in the action region, content of the graphical object moved into the action region is extracted using a natural language processing technique and/or a machine learning algorithm. The parsed content may identify various keywords, as described herein, corresponding to various attributes or properties of an issue managed by an issue tracking platform, and/or a content item managed by a content management system or a content management service of the content collaboration platform. The identified keywords from the extracted content of the graphical object may be used as search criteria for performing one or more structured queries on the issue tracking platform, the content management system, and/or the content management service. By way of a non-limiting example, the one or more structured queries may be executed using one or more application programming interface commands.

At operation 512, an interface window may be displayed on the virtual whiteboard graphical user interface. By way of a non-limiting example, the interface window may display an action to be performed in response to the graphical object being moved into the action region at operation 508, and/or the content extracted at operation 510. Accordingly, a participant user or a host user of the whiteboarding session may review content displayed in the interface window, provide user input or user selection with respect to the content displayed in the interface window, and/or a confirmation to perform the action.

At operation 514, in response to receiving a confirmation from a participant user or a host user of the whiteboarding session, an API command may be generated. The generated API command may include at least a portion of the content extracted at operation 510, and an API action. For an action region that is a user-defined action region, the API action may correspond with an action assigned to the action region at operation 506. Otherwise, the API action may correspond with an action associated with the preconfigured action region, or an action as determined based on the content extracted at operation 510.

At operation 516, the API command generated at operation 514 may be executed on the respective issue tracking platform and/or the content management system.

FIG. 6 depicts an example flow chart 600 of a process for collaboration among the group of users using a virtual whiteboard graphical user interface, as described above in accordance with some embodiments. At operation 602, a participant user of a whiteboarding session or a host user of the whiteboarding session may designate an action region configured to receive a graphical object from other areas of the virtual whiteboard graphical user interface. The graphical object may be received in the action region as a result of a user moving or dragging the graphical object from its current location on the virtual whiteboard graphical user interface into the action region. The graphical object may be similar to a graphical object, as described herein using FIGS. 2A-2E, and/or 3A-3B, and the action region may be similar to an action region, as described herein using FIGS. 2A-2E, and/or 3A-3B, for example.

At operation 604, properties of the graphical object that is dragged or moved into the designated area may be analyzed using a natural language processing technique or a machine-learning algorithm. The properties of the graphical object may include text, and the text may be parsed using the natural language processing technique or the machine-learning algorithm to identify various keywords. Based on the keywords identified at the operation 604, at operation 606, the graphical object may be identified as being related to a content item being managed by a content management system and/or a content management service of a content collaboration platform, and at operation 608, an action that is to be performed on the content item may be identified.

At operation 610, a dialog box similar to an interface window, as described herein, may be presented, or displayed on the virtual whiteboard graphical user interface. The presented or displayed dialog box may include a page retrieved from the content management system corresponding to the content item, and in accordance with the properties of the graphical object including but not limited to the identified keywords.

At operation 612, a user input corresponding to one or more input boxes displayed in the dialog box may be received, as described above using FIGS. 3A-3B, in accordance with some embodiments. At operation 614, an API call may be executed to the content management system to perform the identified action associated with the graphical object that is moved into the action region.

FIG. 7 depicts an example flow chart 700 of a process for collaboration among a group of users using a virtual whiteboard graphical user interface, as described above in accordance with some embodiments. At operation 702, a participant user of a whiteboarding session or a host user of the whiteboarding session may designate an action region configured to receive a graphical object from other areas of the virtual whiteboard graphical user interface. The graphical object may be received in the designated area as a result of a user moving or dragging the graphical object from its current location on the virtual whiteboard graphical user interface into the designated area. The graphical object may be similar to a graphical object, as described herein using FIGS. 2A-2E, and/or 3A-3B, and the designated area may be similar to an action region, as described herein using FIGS. 2A-2E, and/or 3A-3B, for example.

At operation 704, a role of a participant user during a whiteboarding session may be identified based on a user profile associated with the participant user. The user profile may be retrieved based on authentication of the participant user. At operation 706, based on the identified role of the participant user, a control may be provided to the participant user to move or drag a graphical object into an action region.

At operation 708, properties of the graphical object that is dragged or moved into the designated area may be analyzed using a natural language processing technique or a machine-learning algorithm. The properties of the graphical object may include text, and the text may be parsed using the natural language processing technique or the machine-learning algorithm to identify various keywords. Based on the keywords identified at the operation 708, at operation 710, the graphical object may be identified as being related to an issue being managed by an issue tracking platform, and at operation 712, an action that is to be performed on the issue tracking platform may be identified.

At operation 714, a dialog box similar to an interface window, as described herein, may be presented, or displayed on the virtual whiteboard graphical user interface. The presented or displayed dialog box may include a number of fields to receive user input to perform the identified action on the issue tracking platform. At operation 716, in accordance with the received user input, an API call may be executed to the issue tracking platform to perform the identified action associated with the graphical object that is moved into the action region.

A virtual whiteboard graphical user interface described above using FIGS. 2A-2E, and/or 3A-3B is not limited to automatically cause execution of various operations with respect to an issue tracking platform and/or a content management system. There are many different applications that a skilled artisan may develop based on the present disclosure. For example, a graphical object may be related to a song, and by moving a number of graphical objects in the action region, a user can create an album. Songs in the created album may be in an order according to a relative position of various graphical objects in the action region. In another example, a graphical object may be related to a presentation slide or a document portion, and by moving graphical objects into the action region, a presentation based on contribution from various participant users, or a document from contribution from various participant users may be easily created. The generated presentation or document may have a layout that is determined based on a relative position of various graphical objects in the action region.

FIG. 8 depicts an example flow chart 800 of a process for automation using a whiteboarding application interface instance, in accordance with some embodiments. As shown in the flow chart 800, at 802, a graphical user interface of a whiteboarding application instance may be displayed on a client device. The displayed graphical user interface of the whiteboarding application instance may include a multi-user editable region or virtual canvas that is configured to contemporaneously receive one or more object creation commands from one or more client devices, which client devices may be operably coupled to a whiteboarding service platform executing on a whiteboarding backend, as described herein. The one or more object creation commands may correspond with creation of one or more graphical objects (such as virtual note objects) and/or one or more automation regions, as described herein. Further, as described herein, more than one user may collaborate with each other during a whiteboarding session, and accordingly, creation of a graphical object on a graphical user interface of a whiteboarding application instance on a client device of one participating user of the whiteboarding session may cause display of the same graphical object on a graphical user interface of a whiteboarding application instance on another client device of another participating user of the whiteboarding session.

At 804, in response to a user input, and in particular, as described herein using FIG. 4A, an automation region may be created within the graphical user interface, and in particular within the virtual canvas. At 806, in response to a user input, such as selection of the option 412, an automation interface UI (or a first automation interface UI) may be displayed. The displayed automation interface UO may include an option to select a platform (e.g., a third-party system or platform) from a set of multiple platforms, as described herein using FIG. 4B. the platform that can be displayed for a user to select may be an issue management system, a document management system, a content management system, and/or a client device itself, and so on.

At 808, upon selection of a particular platform from the set of multiple platforms, an integration registry may be queried, and an available set of integrations may be identified to obtain a particular integration identifying a particular trigger and a particular action as a user input or a user selection. At 810, a set of integration fields may be obtained based on the user configured trigger and action associated with the particular integration. One or more integration fields of the set of integration fields may be populated based on parsing of content of a graphical object, a subset of the set of integration fields may require input from the user, and at 812, an automation interface UI (or a second automation interface UI) may be generated and displayed with a set of fields, which corresponds to at least a subset of the set of integration fields. Since querying of an integration registry and obtaining of an integration are described herein with sufficient details using FIG. 4C, those details are not repeated here for brevity.

At 814, user input may be received corresponding to displayed set of fields of the second automation interface UI, and at 816 the integration may be associated with the automation region created at 804. At 818, in response to a graphical object corresponding to an object being selected, dragged, and dropped into the automation region, an automation configured with respect to the particular platform selected at 806 and 808 may be performed.

FIG. 9 depicts an example flow chart 900 of a process for automation using a whiteboarding application interface instance, in accordance with some embodiments. As shown in the flow chart 900, at 902, a graphical user interface of a whiteboarding application instance (or a whiteboarding application interface instance) may be displayed on a client device. The displayed graphical user interface of the whiteboarding application instance may include a virtual canvas that is configured to contemporaneously receive one or more object creation commands from one or more client devices, which client devices may be operably coupled to a whiteboarding service platform executing on a whiteboarding backend, as described herein. The one or more object creation commands may correspond with creation of one or more graphical objects (such as virtual note objects) and/or one or more automation regions, as described herein. Further, as described herein, more than one user may collaborate with each other during a whiteboarding session, and accordingly, creation of a graphical object on a graphical user interface of a whiteboarding application instance on a client device of one participating user of the whiteboarding session may cause display of the same graphical object on a graphical user interface of a whiteboarding application instance on another client device of another participating user of the whiteboarding session.

At 904, in response to a user input, and in particular, as described herein using FIG. 4A, an automation region may be created or defined as a portion of the virtual canvas by selecting or designating an automation primitive. At 906, an integration registry may be queried, and an available set of integrations may be identified corresponding to a number of platforms or a set of platforms to obtain a particular integration identifying a particular trigger and a particular action as a user input or a user selection. A set of fields may be obtained based on the user configured trigger and action associated with the particular integration. One or more fields of the set of fields may be populated based on parsing of content of a graphical object, a subset of the set of integration fields may require input from the user, and at 908, an automation interface UI (or a second automation interface UI) may be generated and displayed with the set of fields. Since querying of an integration registry and obtaining of an integration are described herein with sufficient details using FIG. 4C, those details are not repeated here for brevity.

At 910, user input may be received corresponding to the displayed set of fields of the second automation interface UI, and the integration may be associated with the automation region created at 904. At 912, in response to a graphical object corresponding to an object being selected, dragged, and dropped into the automation region, an automation configured with respect to the particular platform may be performed, and content of the graphical object in the automation region may be updated, for example, to display a selectable graphical object, using an application programming interface (API) call to the particular platform.

FIG. 10 depicts an example flow chart 1000 of a process for automation using a whiteboarding application interface instance, in accordance with some embodiments. As shown in the flow chart 1000, at 1002, a graphical user interface of a whiteboarding application instance (or a whiteboarding application interface instance) may be displayed on a client device. The displayed graphical user interface of the whiteboarding application instance may include a virtual canvas and an action region. The virtual canvas and the action region may be configured to contemporaneously receive one or more object creation commands from one or more client devices, which client devices may be operably coupled to a whiteboarding service platform executing on a whiteboarding backend, as described herein. The one or more object creation commands may correspond with creation of one or more graphical objects (such as virtual note objects) and/or one or more action regions such as automation regions, as described herein. Further, as described herein, more than one user may collaborate with each other during a whiteboarding session, and accordingly, creation of a graphical object on a graphical user interface of a whiteboarding application instance on a client device of one participating user of the whiteboarding session may cause display of the same graphical object on a graphical user interface of a whiteboarding application instance on another client device of another participating user of the whiteboarding session.

At 1004, in response to a graphical object of a set of graphical objects created by a user being selected, dragged, and dropped into the action region, content from the graphical object dropped into the action region may be extracted. For example, a current user of the issue management system, and a current project associated with the graphical object may be extracted and identified. At 1006, based on the extracted content, and a particular automation configured for the action region, an API command may be formulated and executed on a third-party platform, such as an issue management system. By way of a non-limiting example, prior to execution of the API command to perform the action on the issue management system, whether the identified current user of the issue management system is an authenticated user of the issue management system or not may be validated. Upon determining that the identified current user is an unauthenticated user of the issue management system, an authentication interface may be displayed to receive user authentication credentials. In response to a successful authentication of the identified current user using the received user authentication credentials, the API command may be automatically executed. In response to an unsuccessful authentication of the identified current user using the received user authentication credentials, an error notification may be displayed on the whiteboarding application interface instance.

At 1008, in accordance with an execution status of the API command, content of the graphical object placed within the action region may be updated and displayed. By way of a non-limiting example, the content of the graphical object may be updated to include a selectable graphical object corresponding to an issue managed by the issue management system. In some cases, the original graphical object is replaced by a corresponding selectable graphical object having content extracted from the external object (e.g., an issue managed by an issue tracking system). By way of a non-limiting example, in response to detecting a user cursor in a predefined proximity of the displayed graphical object in the action region, one or more parameters associated with the object managed by the issue management system may be displayed as an overlay window over the graphical object displayed in the action region.

FIG. 11 shows a sample electrical block diagram of an electronic device 1100 that may perform the operations described herein. The electronic device 1100 may in some cases take the form of any of the electronic devices described with reference to FIGS. 1, 2A-2E. 3A-3B, 4A-4G, and 5-10, including client devices, and/or servers or other computing devices associated with the collaboration system 100. The electronic device 1100 can include one or more of a processing unit 1102, a memory 1104 or storage device, input devices 1106, a display 1108, output devices 1110, and a power source 1112. In some cases, various implementations of the electronic device 1100 may lack some or all of these components and/or include additional or alternative components.

The processing unit 1102 can control some or all of the operations of the electronic device 1100. The processing unit 1102 can communicate, either directly or indirectly, with some or all of the components of the electronic device 1100. For example, a system bus or other communication mechanism 1114 can provide communication between the processing unit 1102, the power source 1112, the memory 1104, the input device(s) 1106, and the output device(s) 1110.

The processing unit 1102 can be implemented as any electronic device capable of processing, receiving, or transmitting data or instructions. For example, the processing unit 1102 can be a microprocessor, a processor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1108) may be controlled by a second processing unit, where the first and second processing units may or may not be in communication with each other.

The power source 1112 can be implemented with any device capable of providing energy to the electronic device 1100. For example, the power source 1112 may be one or more batteries or rechargeable batteries. Additionally, or alternatively, the power source 1112 can be a power connector or power cord that connects the electronic device 1100 to another power source, such as a wall outlet.

The memory 1104 can store electronic data that can be used by the electronic device 1100. For example, the memory 1104 can store electronic data or content such as, for example, audio and video files, documents and applications, device settings and user preferences, timing signals, control signals, and data structures or databases. The memory 1104 can be configured as any type of memory. By way of example only, the memory 1104 can be implemented as random access memory, read-only memory, Flash memory, removable memory, other types of storage elements, or combinations of such devices.

In various embodiments, the display 1108 provides a graphical output, for example associated with an operating system, user interface, and/or applications of the electronic device 1100 (e.g., a chat user interface, an issue-tracking user interface, an issue-discovery user interface, etc.). In one embodiment, the display 1108 includes one or more sensors and is configured as a touch-sensitive (e.g., single-touch, multi-touch) and/or force-sensitive display to receive inputs from a user. For example, the display 1108 may be integrated with a touch sensor (e.g., a capacitive touch sensor) and/or a force sensor to provide a touch- and/or force-sensitive display. The display 1108 is operably coupled to the processing unit 1102 of the electronic device 1100.

The display 1108 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1108 is positioned beneath and viewable through a cover that forms at least a portion of an enclosure of the electronic device 1100.

In various embodiments, the input devices 1106 may include any suitable components for detecting inputs. Examples of input devices 1106 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input device(s) 1106 include a touch sensor (e.g., a capacitive touch sensor) integrated with the display 1108 to provide a touch-sensitive display. Similarly, in some cases, the input device(s) 1106 include a force sensor (e.g., a capacitive force sensor) integrated with the display 1108 to provide a force-sensitive display.

The output devices 1110 may include any suitable components for providing outputs. Examples of output devices 1110 include light emitters, audio output devices (e.g., speakers), visual output devices (e.g., lights or displays), tactile output devices (e.g., haptic output devices), communication devices (e.g., wired, or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

Figure 12:
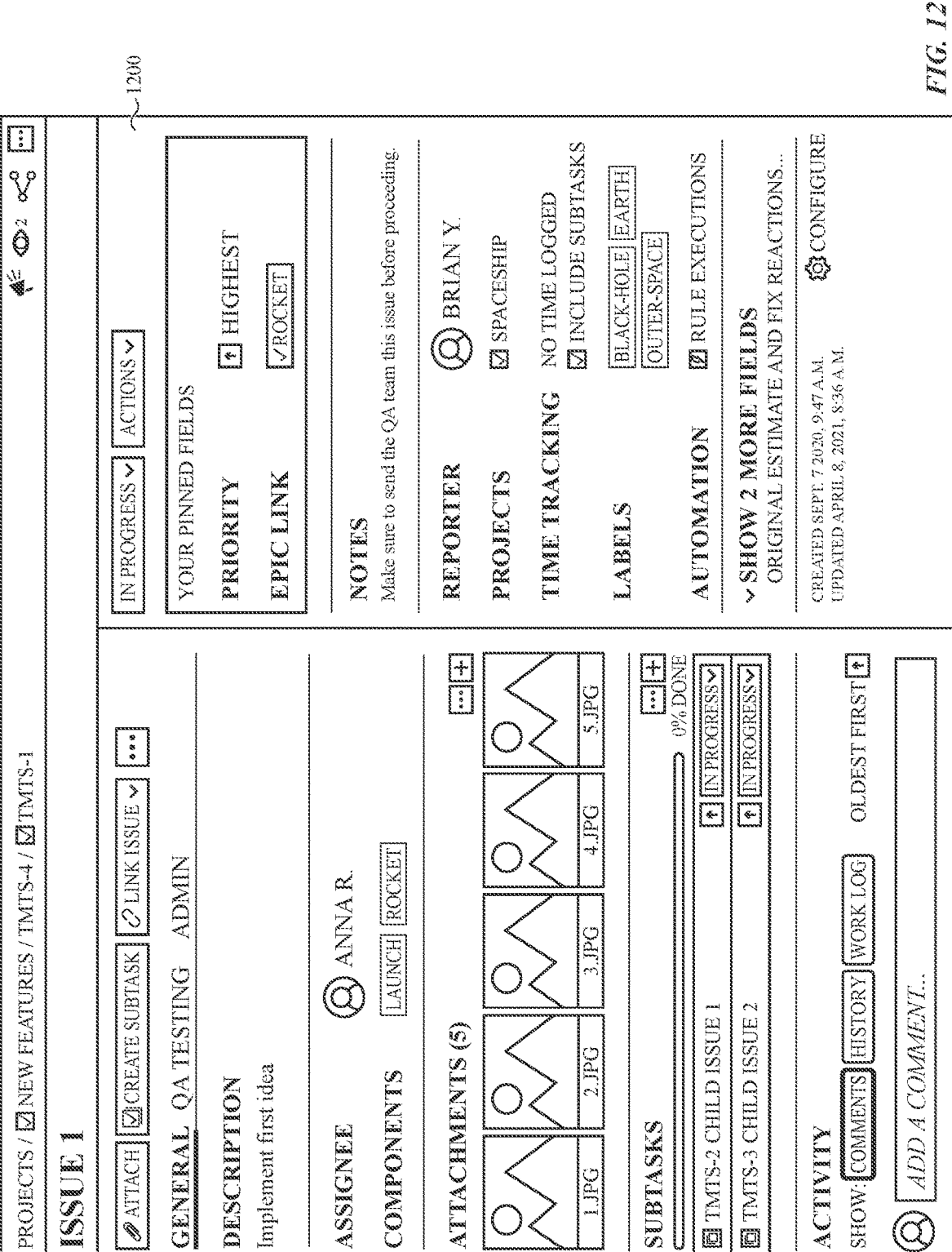
FIG. 12 depicts an example graphical user interface of an issue tracking system.

Selectable graphical objects in the virtual whiteboard correspond to issue objects in the issue tracking system and may be selectable to display additional information about the issue in the graphical user interface of the virtual whiteboarding application or in a graphical user interface of the issue tracking system. FIG. 12 depicts an example graphical user interface 1200 of an issue tracking system. Specifically, the graphical user interface 1200 depicts issue object data associated with an issue managed and tracked by a corresponding issue tracking system or platform. The graphical user interface 1200 may be displayed in response to a user selection of one of the issue objects described herein. The graphical user interface 1200 may be provided by a frontend or client of an issue tracking platform executing or operating on a client device. The graphical user interface 1200 may include various issue or object data that is associated with the respective issue. As described previously, some of this issue data may be used to generate the issue graphical elements in the virtual whiteboarding application. Changes to the issue data occurring due to input received at the graphical user interface 1200 or otherwise implemented by the issue tracking system will automatically be updated when the issue graphical element is loaded or refreshed. The graphical user interface 1200 depicts the issue on a single screen, however, the issue data may be displayed using a series of tabs or links available through the graphical user interface 1200.

As shown in FIG. 12, the issue data includes text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as image or other media files. Other example attachment content includes source code files, test results, user logs, and other similar content. The issue data may also include references or links to other system objects including, for example, projects or epics, which may have a parent-child relationship with the particular issue. Similarly, the issue data may include references or links to other issues identified as subtasks of the issue and may have a child-parent relationship with the particular issue. The issue data may also include references or pointers to other system elements like a system user or user profile identified as an assignee, owner, reviewer, or other role associated with the issue object.

While the foregoing discussion is directed to issue objects in the virtual whiteboard application corresponding to issues managed by the issue tracking system, the same principles apply to objects managed by any third-party system. For example, the same principles apply to content items managed by a content management system, mockup items managed by a user interface design system, or any other objects managed by any other third-party system. The virtual whiteboarding application may operate as described above to generate graphical elements corresponding to an object managed by a third-party system, accept user input for moving or modifying the graphical elements and thus the objects corresponding thereto, relate graphical elements and thus the objects corresponding thereto, and visualize relationships between objects.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B. or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, which are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for generating automated actions in a virtual whiteboarding application, the method comprising:

causing display of a virtual whiteboard graphical user interface including a virtual canvas;

causing display of a set of user-defined graphical objects within the virtual canvas, the set of user-defined graphical objects generated in response to input received from multiple users participating in a whiteboarding session;

in response to receiving a first user input from a first user of the multiple users, generating an automation primitive defining an automation region within the virtual canvas;

causing display of an automation interface user interface comprising:

a platform selection field configured to cause designation of a particular external platform of a set of external platforms; and an action field configured to cause designation of a particular external action of a set of external actions executable at the particular external platform, the particular external action to be performed by the particular external platform;

in response to receiving a second user input from the first user at the platform selection field of the automation interface user interface, assigning a first value to the platform selection field, the first value identifying a selection of an external platform;

in response to receiving a third user input from the first user at the action field of the automation interface user interface, assigning a second value to the action field, the second value identifying an assignment of an action to be performed on one or more objects of the external platform;

in response to receiving a fourth user input from the first user, causing a particular user-generated graphical object within the virtual canvas to be placed into the automation region;

in response to the particular user-generated graphical object being placed within the automation region, extracting content from the particular user-generated graphical object;

generating, for the API gateway of the selected external platform, an application programming interface (API) command to perform the assigned action, the API command including at least a portion of the extracted content; and causing the API command to be executed, the execution of the API command causing the assigned action to be performed with respect to the one or more objects of the external platform using the extracted content.

2. The computer-implemented method of claim 1, wherein:

the external platform is an issue tracking platform;

the action assigned to the automation region is an issue creation action; and the extracted content includes at least one of an issue description, an issue title, or an issue assignee.

3. The computer-implemented method of claim 2, wherein:

the API command causes a new issue to be created by the issue tracking platform; and the new issue includes an attribute that includes the at least one of the issue description, the issue title, or the issue assignee.

4. The computer-implemented method of claim 2, wherein:

the action assigned to the action region is an issue modification action; and in response to the particular graphical object being placed within the automation region, the method further comprises, identifying an issue of the issue tracking platform by performing a structured query on the issue tracking platform using the extracted content.

5. The computer-implemented method of claim 1, wherein:

the API command causes a new object to be created on the external platform;

in response the creation of the new object on the external platform, the particular graphical object is replaced with a selectable graphical object; and the selectable graphical object includes data extracted from the new object and is selectable to cause redirection to a graphical user interface of the external platform depicting content of the new object.

6. The computer-implemented method of claim 1, wherein:

in response to moving the particular user-generated graphical object into the automation region, causing display of an interface window; and the interface window includes a set of user-editable fields including at least two of more of:

an issue identifier;

an assignee of an issue;

a reporter of the issue;

an issue task; or a project associated with the issue.

7. The computer-implemented method of claim 6, wherein the user-editable field for the reporter of the issue is automatically populated with a name corresponding to the first user causing movement of the particular graphical object into the automation region.

8. The computer-implemented method of claim 6, wherein:

the project associated with the issue is automatically populated based on a structured query performed on an issue tracking platform; and the structured query includes content extracted from the particular user-generated graphical object.

9. The computer-implemented method of claim 1, wherein:

the automation interface user interface further comprises a trigger event field configured to designate a particular trigger event;

causing the assigned action to be performed with respect to the one or more objects of the external platform using the extracted content is in response to a trigger event; and the method further comprises:

receiving a user trigger input at the trigger event field, thereby assigning a trigger value to the trigger event field, the trigger value identifying an assignment of the trigger event with respect to the assigned action.

10. A computer-implemented method for generating automated actions in a virtual whiteboard application, the method comprising:

causing display of a virtual canvas in a virtual whiteboard graphical user interface on a client device operably coupled to a whiteboard backend operating on a server;

causing display of a set of user-defined graphical objects generated in response to input provided by multiple users concurrently operably coupled to the whiteboard backend;

in response to receiving a first user input from a first user of the multiple users causing generation of an automation primitive defining an automation region within the virtual canvas;

causing display of an automation interface user interface comprising:

a platform selection field configured to cause designation of a particular external platform of a set of external platforms; and an action field configured to cause designation of a particular external action of a set of external actions associated with the particular external platform, the particular external action to be performed by the particular external platform;

in response to receiving a second user input from the first user at the platform selection field of the automation interface user interface, assigning a first value to the platform selection field, the first value identifying a selection of an external platform;

in response to receiving a third user input from the first user at the action field of the automation interface user interface, assigning a second value to the action field, the second value identifying an assignment of an action to be performed on one or more objects of the external platform;

in response to receiving a fourth user input from the first user, selecting a particular graphical object of the set of user-defined graphical objects and causing the particular graphical object to be placed in the automation region;

in response to the particular graphical object being placed within the automation region, extracting content from the particular graphical object; and causing, at the selected external platform, an automated action to be performed with respect to the one or more objects using the extracted content.

11. The computer-implemented method of claim 10, wherein:

the automated action is an application programming interface (API) command to the external platform; and the API command includes the extracted content.

12. The computer-implemented method of claim 11, wherein:

the external platform is an issue tracking platform; and the API command is configured to create a new issue in the issue tracking platform using the extracted content.

13. The computer-implemented method of claim 11, wherein:

the external platform is an issue tracking platform;

the API command is configured to identify an existing issue using the extracted content; and the particular graphical object is modified to include content extracted from the existing issue of the issue tracking platform.

14. The computer-implemented method of claim 11, wherein:

the external platform is an issue tracking platform;

in response to the particular graphical object being placed within the automation region, a structured query to the issue tracking platform is executed using the extracted content to identify an existing issue of the issue tracking platform; and the API command causes a change of a state of the existing issue in the issue tracking platform.

15. The computer-implemented method of claim 10, wherein:

in response to multiple graphical objects being placed within the automation region:

extracting content from each of the multiple graphical objects; and generating at least one application programming interface command using the content extracted from each of the multiple graphical objects.

16. The computer-implemented method of claim 10, wherein each graphical object of the set of graphical objects is a virtual note object having user-generated text content.

17. A computer-implemented method for generating automated actions in a virtual whiteboard graphical user interface of a content collaboration platform, the method comprising:

causing display of the virtual whiteboard graphical user interface including a virtual canvas having a set of user-defined graphical objects containing user-generated content, the set of user-defined graphical objects generated in response to input received from two or more users during a whiteboarding session;

in response to receiving a first user input from a first user creating an action primitive having an action region within the virtual canvas;

causing display of an automation interface user interface comprising:

a platform selection field configured to cause designation of a particular external platform of a set of external platforms; and an action field configured to cause designation of a particular external action of a set of external actions associated with the particular external platform, the particular external action to be performed by the particular external platform;

in response to receiving a second user input from the first user at the platform selection field of the automation interface user interface, assigning a first value to the platform selection field, the first value identifying a selection of an external platform;

in response to receiving a third user input from the first user at the action field of the automation interface user interface, assigning a second value to the action field, the second value identifying an assignment of an action to be performed on one or more objects of the external platform;

in response to receiving a fourth user input from the first user, selecting a particular graphical object of the set of user-defined graphical objects and causing the particular graphical object to be placed in the action region;

in response to the particular graphical object being placed within the action region, extracting content from the particular graphical object;

causing display of an interface window including a preview of the action to be performed with respect to the one or more objects at the external platform using the extracted content; and in response to a confirmation input, causing the action to be performed with respect to the one or more objects of the external platform using the extracted content.

18. The computer-implemented method of claim 17, wherein:

the action includes executing an application programming interface (API) with respect to a collaboration system configured to manage a document space having multiple pages; and the action causes generation of a new page in the collaboration system, the new page including the content extracted from a one or more graphical objects positioned in the action region.

19. The computer-implemented method of claim 18, wherein a layout of the new page is determined based on a relative position of one or more graphical objects positioned in the action region.

20. The computer-implemented method of claim 17, wherein the action includes executing an application programming interface (API) with respect to a collaboration system configured to manage multiple pages having user-generated content; and the action includes identifying an existing page managed by the collaboration system, and modify the existing page to include the content extracted from the particular graphical object positioned within the action region.

21. The computer-implemented method of claim 17, wherein:

the action primitive is a first action primitive;

the action region is a first action region;

in response to a fourth user input by the first user, generating a second action primitive having a second action region within the virtual canvas; and in response to a fifth user input by the first user, causing the first action region to be linked to the second action region to define a chained action operation.

\* \* \* \* \*